(12) United States Patent
Kang et al.

(10) Patent No.: US 12,160,926 B2
(45) Date of Patent: Dec. 3, 2024

(54) METHOD AND APPARATUS FOR TRANSMITTING AND PROCESSING PROFILE MANAGEMENT MESSAGE FOR MULTIPLE ENABLED PROFILES BETWEEN TERMINAL AND UNIVERSAL INTEGRATED CIRCUIT CARD

(71) Applicant: Samsung Electronics Co., Ltd., Suwon-si (KR)

(72) Inventors: Sujung Kang, Suwon-si (KR); Kangjin Yoon, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 17/651,539

(22) Filed: Feb. 17, 2022

(65) Prior Publication Data

US 2022/0264284 A1 Aug. 18, 2022

(30) Foreign Application Priority Data

Feb. 18, 2021 (KR) .......................... 10-2021-0022089
Nov. 22, 2021 (KR) .......................... 10-2021-0161608

(51) Int. Cl.
*H04W 8/18* (2009.01)
*H04W 12/40* (2021.01)
(Continued)

(52) U.S. Cl.
CPC ........... *H04W 8/183* (2013.01); *H04W 48/17* (2013.01); *H04W 60/005* (2013.01); *H04W 12/40* (2021.01)

(58) Field of Classification Search
CPC ... H04W 8/183; H04W 48/17; H04W 60/005; H04W 12/40
(Continued)

(56) References Cited

U.S. PATENT DOCUMENTS 10,708,761 B1 7/2020 Yin et al.
2019/0050704 A1* 2/2019 Yi ......................... H04W 12/08
(Continued)

FOREIGN PATENT DOCUMENTS

EP           3413602 A1   12/2018
KR   10-2022-0018882 A    2/2022

OTHER PUBLICATIONS

International Search Report dated May 30, 2022 in connection with International Patent Application PCT/KR2022/002327, 3 pages.

(Continued)

*Primary Examiner* — Nghi H Ly

(57) ABSTRACT

The disclosure relates to a 5G or 6G communication system for supporting a higher data rate than a 4G communication system such as LTE. An embodiment of the disclosure provides a method and an apparatus for determining a scheme of accessing an ISD-R corresponding a profile management module in an eUICC in a terminal (a modem or an LPA) during terminal-card initialization. In addition, an embodiment of the disclosure provides a method for determining, by an LPA, a scheme of access an ISD-R to be used by the LPA, with reference to a scheme determined during terminal-card initialization or a pre-configured scheme, and transferring a message to an eUICC. In addition, an embodiment of the disclosure provides a method and an apparatus for configuring, by an LPA, different profile management messages according to determined ISD-R access schemes, and perform transferring through a selected ISD-R access scheme.

20 Claims, 18 Drawing Sheets

(51) Int. Cl.
*H04W 48/00* (2009.01)
*H04W 60/00* (2009.01)

(58) Field of Classification Search
USPC .......... 455/558, 410, 414.1, 418, 466, 435.1
See application file for complete search history.

(56) References Cited

U.S. PATENT DOCUMENTS

| | | |
|---|---|---|
| 2019/0166488 A1 | 5/2019 | Park et al. |
| 2020/0137034 A1 | 4/2020 | Di Cosmo et al. |
| 2020/0137555 A1 | 4/2020 | Dos Santos et al. |
| 2020/0228488 A1 | 7/2020 | Xu et al. |

OTHER PUBLICATIONS

Written Opinion of the International Searching Authority dated May 30, 2022 in connection with International Patent Application PCT/KR2022/002327, 3 pages.
Supplementary European Search Report dated Jun. 4, 2024, in connection with European Patent Application No. 22756508.2, 12 pages.

* cited by examiner

FIG. 9A

Case 1(9-10) : When eUICC does not know ISD-R selection scheme of LPA
▲ LPA optionally adds port number and performs transmission
▲ When there is port number, eUICC performs processing by using received port number
▲ When there is no port number, eUICC performs enabling processing by using transmission port
▲ When there is no port number and there is Port Selection by eUICC flag, eUICC performs enabling processing by using one port by eUICC itself

|  |  | Port where ES10x.command is sent | |
|---|---|---|---|
|  |  | Port #0 | Port #1 |
| ES10x.command including | Port #0 | Port #0 | Port #0 |
|  | Port #1 | Port #1 | Port #1 |
|  | No Port # w/Port Selection by eUICC flag | Perform enabling by selecting one of Port #0 and Port #1 and respond with port number used for enabling | |
|  | No Port # | Port #0 or Reject | Port #1 or Reject |

Case 2(9-20): When eUICC does not know ISD-R selection scheme of LPA
▲ LPA always adds port number and performs transmission
▲ eUICC performs processing by using port number and performs processing as Reject when there is no port number
▲ In exceptional case, when there is no port number but there is Port Selection by eUICC flag,
  eUICC performs enabling processing by using one port by eUICC itself

| ES10x.command including | | Port where ES10x.command is sent | |
|---|---|---|---|
| | | Port #0 | Port #1 |
| | Port #0 | Port #0 | Port #0 |
| | Port #1 | Port #1 | Port #1 |
| | No Port # w/Port Selection by eUICC flag | Perform enabling by selecting one of Port #0 and Port #1, respond with port number used for enabling | |
| | No Port # | Reject | Reject |

Case 3(9-30)
LPA mandatorily adds port number as exclusive port only, and performs transmission
▲ eUICC knows determined ISD-R access scheme, and accordingly, performs enabling processing by using transmission port number
▲ When reception is performed without port number or there is Port Selection by eUICC flag,
  eUICC performs enabling processing by using one port by eUICC itself

|  |  | Port where ES10x.command is sent | |
|---|---|---|---|
|  |  | Port #0 (Exclusive) | Port #1 |
| ES10x.command including | Port #0 | Port #0 | Reject |
|  | Port #1 | Port #1 | Reject |
|  | No Port # w/Port Selection by eUICC flag | Perform enabling by selecting one of Port #0 and Port #1 and respond with port number used for enabling | Reject |
|  | No Port # | Reject or perform enabling by selecting one of Port #0 and Port #1 and respond with port number used for enabling | Reject |

Case 4 (9-40)
LPA performs transmission in any port scheme without port number
▲ eUICC knows determined ISD-R access scheme, and accordingly, perform enabling processing by using transmission port
▲ According to eUICC configuration, in exceptional case, when port number = transmission port number,
  reject or perform enabling processing by using corresponding port
▲ When Port Selection by eUICC flag is received without port number, eUICC neglects Port Selection by eUICC flag

|  |  | Port where ES10x.command is sent | |
| --- | --- | --- | --- |
|  |  | Port #0 | Port #1 |
| ES10x.command including | Port #0 | Reject or Port #0 | Reject |
|  | Port #1 | Reject | Reject or Port #1 |
|  | No Port # w/Port Selection by eUICC flag | Neglect Port Selection by eUICC flag and perform processing in same manner as case of No Port # | |
|  | No Port # | Port #0 | Port #1 |

Case 5 [9-50]
LPA mandatorily adds port number as dedicated port only, and performs transmission
▲ eUICC knows determined ISD-R access scheme, and accordingly, perform enabling processing by using transmission port number

[9-55]

| | | Port where ES10x.command is sent | |
|---|---|---|---|
| | | Port #0 (Dedicated) | Port #1 |
| ES10x.command including | Port #0 | Port #0 | Reject |
| | Port #1 | Port #1 | Reject |
| | No Port # w/Port Selection by eUICC flag | Perform enabling by selecting one of Port #0 and Port #1 and respond with port number used for enabling | Reject |
| | No Port # | Reject or perform enabling by selecting one of Port #0 and Port #1 and respond with port number used for enabling | Reject |

METHOD AND APPARATUS FOR TRANSMITTING AND PROCESSING PROFILE MANAGEMENT MESSAGE FOR MULTIPLE ENABLED PROFILES BETWEEN TERMINAL AND UNIVERSAL INTEGRATED CIRCUIT CARD

CROSS-REFERENCE TO RELATED APPLICATIONS

This application is based on and claims priority under 35 U.S.C. 119 to Korean Patent Application No. 10-2021-0022089 filed on Feb. 18, 2021 and Korean Patent Application No. 10-2021-0161608 filed on Nov. 22, 2021, in the Korean Intellectual Property Office, the disclosures of which are herein incorporated by reference in their entirety.

BACKGROUND

1. Field

The disclosure relates to a method for transmitting and processing a profile management message between a terminal and a universal integrated circuit card (UICC) in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as Beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

A universal integrated circuit card (UICC) is a smart card inserted into a terminal, for example, a mobile communication terminal, etc., and used, and is also called a UICC card. The UICC may include an access control module for accessing the network of a mobile communication service provider. Examples of the access control module include a universal subscriber identity module (USIM), a subscriber identity module (SIM), an Internet protocol (IP) multimedia service identity module (ISIM), etc.

A UICC including the USIM is commonly called a USIM card. Likewise, a UICC including the SIM module is also commonly called a SIM card. Hereinafter, it should be noted that the SIM card can be used to indicate a common meaning including a UICC card, a USIM card, and a UICC including ISIM, etc. That is, the technical application of the SIM card may be identically applied to a USIM card, an ISIM card, or a common UICC card.

The SIM card stores personal information of a mobile communication subscriber and generates subscriber authentication and a traffic security key when access to a mobile communication network is performed, so as to enable safe mobile communication use.

When the SIM card is manufactured, in general, the SIM card is manufactured upon a request from a specific mobile communication service provider, as a card dedicated to the corresponding mobile communication service provider. Authentication information for accessing the network of the corresponding service provider, for example, a universal subscriber identity module (USIM) application, an international mobile subscriber identity (IMSI), a K value, an OPc value, or the like, is mounted on the SIM card in advance, and the card is released. Accordingly, the manufactured SIM card is delivered to the corresponding mobile communication service provider and provided to a subscriber, and thereafter, if necessary, management such as the installation, modification, and deletion of an application within the UICC, may be performed using a technology such as an over the air (OTA) technology.

A subscriber may insert the UICC card into his or her mobile communication terminal and use the network of the corresponding mobile communication service provider and application services, and when the mobile communication terminal is to be replaced with another one, the subscriber transfers the UICC card from the old mobile communication terminal and inserts the same into a new mobile communication terminal, so that authentication information, mobile communication telephone numbers, a personal telephone directory, etc. which are stored in the UICC card can be used in the new mobile communication terminal without any change.

However, the SIM card is inconvenient when the user of a mobile communication terminal is provided with services of another mobile communication company. The user of a mobile communication terminal has inconvenience because the user has to physically obtain a SIM card in order to receive services from a mobile communication service provider. For example, when a user travels to a different country, the user has inconvenience due to the necessity of purchasing of a local SIM card in order to receive local mobile communication services. Roaming service may solve such inconvenience to some extent, but has problems in that a communication fee is high and services cannot be provided if a contract between communication companies is not made.

If the SIM module is remotely downloaded and installed on the UICC card, most of such inconvenience can be solved. That is, a user may download the SIM module of a mobile communication service to be used onto his or her UICC card when the user wants. Furthermore, such a UICC card may download and install multiple SIM modules, and may select and use only one of the SIM modules. Such UICC card may be fixed or may not be fixed to a terminal. Specifically, the UICC fixed to the terminal and used is called an eUICC, wherein in general, the eUICC means a UICC card which is fixed to a terminal and used, and can remotely download and select a SIM module. In the disclosure, a UICC card which can remotely download and select a SIM module is collectively called an eUICC. That is, among UICC cards which can remotely download and select a SIM module, a UICC card fixed to a terminal and a UICC card not fixed to a terminal are collectively called and used as an eUICC. Furthermore, downloaded SIM module information will be collectively called and used as a term "eUICC profile".

Even though there are one or more profiles in the eUICC, simultaneous enabling can be performed for one profile only. Accordingly, even though a terminal supports two or more basebands and there are two or more profiles in the corresponding eUICC, the corresponding terminal cannot support a dual SIM function which allows two profiles to be simultaneously used in a single mobile phone. In order to solve this problem, the necessity for multiple enabled profiles (MEPs) which allow existence of one or more profiles in the eUICC and the one or more profiles to be simultaneous enabled is emerging.

However, currently, a selection of a scheme of accessing an ISD-R for processing a profile management command in an eUICC by a terminal during MEP support between the terminal and the eUICC and an operation to be processed by the terminal or the eUICC upon a corresponding determination are not defined. A local profile assistant (LPA) of the terminal, the LPA corresponding to an eUICC control application, includes an ICCID corresponding to an ID of a profile to be managed, in a profile management command to be transmitted to an ISD-R of the eUICC, and transmits the command. The eUICC having received the command may process the profile management command for the corresponding ICCID and transmit the occurrence of a profile state change, an eUICC overall state change, or the like, to a terminal modem to cause the terminal modem to perform necessary processes according to the command transmission. Until now, considering baseband mapping when processing a command for a profile has been unnecessary because one baseband of a terminal modem is connected to (one profile of) one eUICC as a single physical interface. However, when an MEP is supported, there are multiple basebands in the terminal, there are multiple profiles in an eUICC, and there are multiple eSIM ports (as described below, the term eSIM port is used to indicate one physical interface) between the terminal and the eUICC, and thus, a method for transmitting and processing a terminal-eUICC profile management message considering all the basebands, profiles, and eSIM ports needs to be proposed.

The above information is presented as background information only to assist with an understanding of the disclosure. No determination has been made, and no assertion is made, as to whether any of the above might be applicable as prior art with regard to the disclosure.

SUMMARY

Currently, only one profile can be enabled in an eUICC in a wireless communication system, and a profile management message is transmitted or received between a terminal and the eUICC, based on the profile. European Telecommunications Standards Institute (ETSI) and GSM association (GSMA), which correspond to standardization organizations, have recently started to discuss a method of simultaneously enabling two or more profiles in one eUICC, and the necessity for a method for efficiently transmitting a profile management message between the terminal and the eUICC and processing the same in a situation in which two or more profiles can be simultaneously enabled is emerging.

In accordance with an aspect of the disclosure, a method performed by a terminal in a wireless communication system, the method comprising: selecting an access scheme for processing a profile management command in a security module; generating a first message based on the selected access scheme; transmitting, to the security module, the first message through the selected access scheme; and receiving, from the security module, a second message in response to the first message.

In an embodiment of the disclosure, the method further comprises determining an entity for selecting a security module port to be used for profile enabling in case that the selected access scheme is a first access scheme.

In an embodiment of the disclosure, the method further comprises selecting a port number to be used for profile enabling in case that the entity for selecting the security module port is determined as the terminal, wherein the selected port number is included in the first message.

In an embodiment of the disclosure, the method further comprises receiving, from the security module, a message comprising a port number to be used for profile enabling, the port number being selected by the security module, in case that the entity for selecting the security module port is determined as the security module.

In an embodiment of the disclosure, the method further comprises receiving, from the security module, a message comprising an access scheme for processing the profile management command in the security module, the access scheme being selected by the security module.

In accordance with another aspect of the disclosure, a method performed by a security module in a wireless communication system, the method comprising: receiving, from a terminal, a first message through an access scheme for processing a profile management command in a security module, the access scheme being selected by the terminal; and transmitting, to the terminal, a second message in response to the first message, wherein the first message is generated based on the access scheme selected by the terminal.

In accordance with another aspect of the disclosure, a terminal in a wireless communication system, the terminal comprising: a transceiver capable of transmitting or receiving at least one signal; and a controller coupled to the transceiver, wherein the controller is configured to: select an access scheme for processing a profile management command in a security module; generate a first message based on the selected access scheme; transmit, to the security module, a first message through the selected access scheme; and receive, from the security module, a second message in response to the first message.

In accordance with another aspect of the disclosure, a security module in a wireless communication system, the security module comprising: a transceiver capable of transmitting or receiving at least one signal; and a controller coupled to the transceiver, wherein the controller is configured to: receive, from a terminal, a first message through an access scheme for processing a profile management command in a security module, the access scheme being selected by the terminal; and transmit, to the terminal, a second message in response to the first message, wherein the first message is generated based on the access scheme selected by the terminal.

An aspect of various embodiments of the disclosure provides a method and an apparatus for collecting predetermined information required to select a scheme of accessing an ISD-R corresponding a profile management module in an eUICC in a terminal, and selecting an ISD-R access scheme through the information.

Another aspect of various embodiments of the disclosure relates to a method for transmitting a profile management message to the eUICC, based on an ISD-R selection scheme selected by the terminal.

Another aspect of various embodiments of the disclosure relates to a method for determining and processing a profile management command by the eUICC having received the profile management message.

Another aspect of various embodiments of the disclosure provides a method in which the terminal receives, from the eUICC, state change information of the corresponding profile of a modem as the processed result of the profile management, processes the same, restarts a terminal-card initialization process, and completes the profile management command.

Another aspect of various embodiments of the disclosure provides a method and an apparatus for performing processing to perform initialization in the conventional SEP mode, instead of performing initialization in an MEP-supported mode when the terminal and the eUICC support different ISD-R access schemes from each other in a wireless communication system.

Another aspect of various embodiments of the disclosure provides a method and an apparatus for, when an LPA provides a profile enabling message to an eUICC without a port number to be enabled, performing processing in different manners according to an ISD-R selection scheme by the eUICC and a terminal.

The technical subjects pursued in the disclosure may not be limited to the above-mentioned technical subjects, and other technical subjects which are not mentioned may be clearly understood, through the following descriptions, by those skilled in the art to which the disclosure pertains.

According to embodiments of the disclosure, when an operation is determined in a terminal-card MEP mode, an ISD-R access scheme is determined, and a message is transmitted/processed, the following effects can be expected.

When a management message such as enabling/disabling of a communication operator profile is transmitted from a terminal to an eUICC through one physical pin, the eUICC and the terminal may process profile management by distinguishing a profile from among server communication profiles. In addition, determination can be made on a baseband of the terminal, to which the corresponding communication operator profile is mapped, to process a management command. Accordingly, a user can simultaneously use multiple communication operation profiles in a terminal having one eUICC mounted thereon, whereby user convenience can be enhanced. For example, while traveling abroad, the user can simultaneously use the original domestic communication operator profile and a local profile in the traveling country with one eUICC, and can also use two profiles of the same domestic communication operator with one eUICC by distinguishing subscriptions. A terminal manufacturer may provide a dual SIM function without providing an additional terminal mounting space by connecting one eUICC with a modem (providing two or more basebands) through one physical pin. Here, the dual SIM is mentioned, but it should be noted that the terminal can be used as triple SIM and quadruple SIM functions according to the number of available basebands.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9A illustrates an example of a result obtained by combining a profile transmission port and a profile enabling command message (ES10c.EnableProfile( )) and determining a processing method, based on the ISD-R access scheme by the eUICC, proposed in FIG. 8;

FIG. 9B illustrates an example of a result obtained by combining a profile transmission port and a profile enabling command message (ES10c.EnableProfile( )) and determining a processing method, based on the ISD-R access scheme by the eUICC, proposed in FIG. 8;

FIG. 9C illustrates an example of a result obtained by combining a profile transmission port and a profile enabling command message (ES10c.EnableProfile( )) and determining a processing method, based on the ISD-R access scheme by the eUICC, proposed in FIG. 8;

FIG. 9D illustrates an example of a result obtained by combining a profile transmission port and a profile enabling command message (ES10c.EnableProfile( )) and determining a processing method, based on the ISD-R access scheme by the eUICC, proposed in FIG. 8;

FIG. 9E illustrates an example of a result obtained by combining a profile transmission port and a profile enabling command message (ES10c.EnableProfile( )) and determining a processing method, based on the ISD-R access scheme by the eUICC, proposed in FIG. 8;

DETAILED DESCRIPTION

Figure 1:
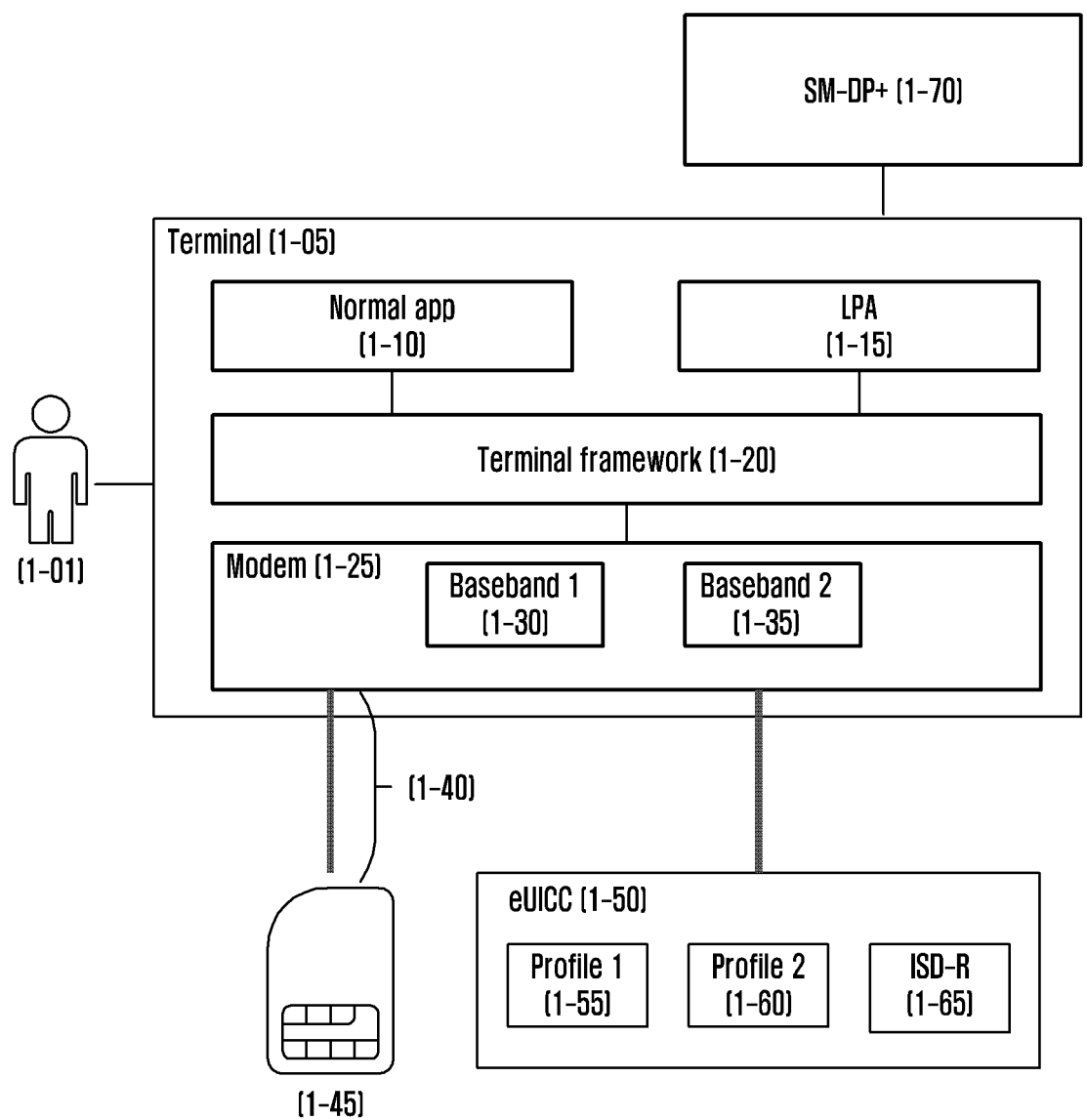
FIG. 1 illustrates elements of a wireless communication system according to an embodiment of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. Further, the terms which will be described below are terms defined in consideration of the functions in the disclosure, and may be different according to users, intentions of the users, or customs. Therefore, the definitions of the terms should be made based on the contents throughout the specification. For the same reason, in the accompanying drawings, some elements may be exaggerated, omitted, or schematically illustrated. Further, the size of each element does not completely reflect the actual size. In the drawings, identical or corresponding elements are provided with identical reference numerals. The advantages and features of the technical idea according to the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure. Herein, it will be understood that each block of the flowchart illustrations, and combinations of blocks in the flowchart illustrations, can be implemented by computer program instructions.

These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved. As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

First, terms used in the disclosure are defined.

In the disclosure, a UICC is a smart card inserted into a mobile communication terminal and used, and means a chip which stores personal information such as network access authentication information of a mobile communication subscriber, a telephone directory, and text messages, and enables the use of safe mobile communication by performing subscriber authentication and traffic security key generation when access to a mobile communication network such as GSM, WCDMA, LTE, and 5G is made. A communication application such as a subscriber identification module (SIM), a universal SIM (USIM), or an IP multimedia SIM (ISIM), is installed on the UICC according to the type of mobile communication network accessed by a subscriber. Furthermore, the UICC may provide a higher level of security function for the installation of various applications such as an electronic wallet, ticketing, and an electronic passport.

In the disclosure, an embedded UICC (eUICC) is not limited to a security module embedded in a terminal, and includes a detachable security module which can be inserted into and detached from the terminal. The eUICC may download a profile by using the over the air (OTA) technology and install the same. The eUICC may be called a UICC capable of profile downloading and installation.

In the disclosure, a method of downloading a profile by using the OTA technology and installing the profile on the eUICC may be applied to a detachable UICC which can be inserted into and detached from a terminal, as described above. For example, an embodiment of the disclosure may be applied to a detachable UICC capable of downloading a profile by using the OTA technology and installing the same.

In the disclosure, the term "UICC" may be interchangeable with a SIM, and the term "eUICC" may be interchangeable with an eSIM.

In the disclosure, a profile may mean that an application, a file system, an authentication key value, etc. which are stored in a UICC have been packaged in a software form. In addition, the profile may be called access information.

In the disclosure, a USIM profile may have the same meaning as a profile and may mean that information included in a USIM application within a profile has been packaged in a software form.

In the disclosure, a profile server corresponds to a server which may provide a function of generating a profile, encrypting the generated profile, generating a profile remote management command, or encrypting the generated profile remote management command, or include a function of supporting multi-profile enabling of a terminal, and may be expressed as subscription manager data preparation (SM-DP), subscription manager data preparation plus (SM-DP+), and subscription manager secure routing (SM-SR).

In the disclosure, a term used herein "terminal" or "device" may be called a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of the terminal may include not only a cellular telephone, a smartphone having a wireless communication function, a personal digital assistant (PDA) having a wireless communication function, a wireless modem, a mobile computer having a wireless communication function, a photographing device such as a digital camera having a wireless communication function, a gaming device having a wireless communication function, music storage and playback home appliances having a wireless communication function, and Internet home appliances capable of wireless Internet access and browsing, but also portable units or terminals in which combinations of such functions have been integrated. Furthermore, the terminal may include a machine to machine (M2M) terminal and a machine-type communication (MTC) terminal/device, but is not limited thereto. In the disclosure, the terminal may be called an electronic device or may be simply called a device.

In the disclosure, the terminal or the device may include software or an application installed on the terminal or the device to control a UICC or eUICC. The software or application may be called a local profile assistant (LPA), for example. In the disclosure, an eUICC identifier (eUICC ID) may be a unique identifier of an eUICC embedded in a terminal, and may be called an EID.

In the disclosure, an application protocol data unit (APDU) may be a message for enabling a controller in a terminal or a device to be linked with an eUICC. An APDU is a pair of a command and a response, and an APDU command and an APDU response are defined in ETSI 102.221 with reference to ISO 7816. As defined in ETSI 102.221, the APDU command has a structure including a header and a body of an APDU, wherein the header includes a class of instruction (CLA), an instruction (INS), instruction parameter 1 (P1), and instruction parameter 2 (P2), and the body includes the number of bytes in the command data filed (Lc), data, and the number of bytes expected in response of the command (Le). The APDU response has a structure including an optional data field, status byte 1 (SW1), and status byte 2 (SW2), and a detailed description there of refers to the ETSI 102.221 standard.

In the disclosure, a profile package may be interchangeable with a profile or used as a term to indicate a data object of a specific profile, and may be referred to as a profile tag, length, value (TLV) or a profile package TLV. The profile identifier may be called an ICCID as a unique identification number of the profile. When a profile package has been encrypted using an encryption parameter, the profile package may be called a protected profile package (PPP) or a protected profile package TLV (PPP TLV). If a profile package has been encrypted using an encryption parameter that can be decoded by a specific eUICC only, the profile package may be called a bound profile package (BPP) or a bound profile package TLV (BPP TLV). The profile package TLV may be a data set that expresses information forming a profile in a TLV format.

In the disclosure, AKA may indicate authentication and key agreement, and may indicate an authentication algorithm for accessing a 3GPP and 3GPP2 network. K is an encryption key value stored in an eUICC used for an AKA authentication algorithm. In the disclosure, OPc is a parameter value which can be stored in an eUICC used for an AKA authentication algorithm.

In this specification, NAA is a network access application app program, and may be an app program stored in a UICC to access a network, such as a USIM or ISIM. NAA may be a network access module.

In the disclosure, an end user, a user, a subscriber, a service subscriber, and a user may be interchangeably used with a user of a corresponding terminal.

In the disclosure, an eSIM port may mean a virtual interface which uses a physical interface connected between the eUICC and the modem by multiplexing and dividing the same, and may be interchangeably used with an eSIM port, a port, a SIM port, an e-port, ePort, and a logical interface.

An eSIM port used by the ISD-R may be called an ISD-R eSIM port, and an eSIM port used by a profile may be called a profile eSIM port, for distinguishment.

In the disclosure, information on a profile which can be sent as a response by an LPA through GetProfileInfo( ) may be used with a term called profile metadata or profile information. The corresponding information may be profile information provided by the SM-DP+ when a profile is installed on a terminal, profile state or configuration information received and processed by the eUICC upon an ES10c command from the LPA, or state/configuration information of a profile when the eUICC satisfies a specific condition.

In the disclosure, a function of enabling and managing multiple profiles existing in a single eUICC is collectively called a multiple enabled profile (MEP) function. In the conventional art, the eUICC can enable maximum one profile, so that a single eUICC cannot support a dual SIM or multi-SIM function. In order to support the dual SIM or multi-SIM function with the single eUICC, there is a need for a function of enabling multiple profiles in a single eUICC and managing the same. An eUICC in which the MEP function is implemented may be called an MEP-supported eUICC. A terminal including a modem in which the MEP function is implemented and terminal software which can support the modem, for example, an LPA, may be called an MEP-supported terminal.

In the disclosure, a mode which is determined, through a terminal-eUICC initialization process, to be operated to enable division-multiplexing and transmission such that one or more logical interfaces can be used in a single physical interface may be called an MEP mode. It should be noted that, even for an MEP-supported terminal or an MEP-supported eUICC, if an operation in the MEP mode is not determined in an initialization process between the terminal and the eUICC, the operation is not performed in the MEP mode. A case where the operation is performed in the corresponding mode may be called a single enabled profile (SEP) mode.

In addition, in describing the disclosure, a detailed description of the related known function or element will be omitted if the description is determined to make the gist of the disclosure unnecessarily vague.

Hereinafter, embodiment(s) proposed in the disclosure will be described with reference to the drawings.

FIG. 1 illustrates elements of a wireless communication system according to an embodiment of the disclosure.

A terminal 1-05 may include a normal app 1-10, an LPA 1-15, a terminal framework 1-20, and an MEP-supported modem 1-25. Here, the normal app 1-10 indicates an app which is pre-loaded in the terminal or can be downloaded and installed, such as a communication operator app or a SIM card manager app, and an app having authority to access a profile of a physical SIM (pSIM) 1-45 or an eUICC 1-50. The LPA 1-15 is an app performing eUICC control, and processes management of a profile while communicating with SM-DP+ 1-70, a terminal user 1-01, and an ISD-R 1-65 in the eUICC 1-50. The LPA 1-15 may be integrated with a single normal terminal application or another normal terminal application, the LPA 1-15 configures a UI to acquire a user input of local management of a profile or receive an SM-DP+ 1-70 remote management command from an SM-DP+ server 1-70, and configures the UI of the corresponding command to acquire the input of the user 1-01, and then the LPA 1-15 transfers the management command of the profile to the ISD-R 1-65 of the eUICC 1-50 to enable/disable/delete/update the profile. The remote profile management (RPM) collectively indicates a series of procedures of performing profile installation/enabling/disabling/deletion and other functions by an instruction transmitted to the terminal from the SM-DP+ 1-70. The RPM may be requested by a communication operator, a service provider, or a terminal owner and an instruction may be generated by the SM-DP+ 1-70.

A communication modem 1-25 of the terminal 1-05 corresponds to a device for modulating and transmitting a signal to transfer information and demodulating the signal to reconstruct the same to an original signal at a receiving end, and has two or more baseband processors (hereinafter, basebands) integrated thereinto to perform wireless communication in a case of the MEP-supported modem. The baseband may be logically implemented in the modem. The modem 1-25 may be connected to a current UICC or an eUICC through a physical pin (a smart card interface in compliance with ISO7816 standard), and operates in a scheme in which when the modem transmits an application protocol data unit (APDU) for a command to the eUICC 1-50 through the corresponding interface, the eUICC 1-50 responds with a resulting value. The SIM card (pSIM) occupies one baseband of the modem through one physical pin and one pSIM has a SIM port. The SIM port may be interchangeably used with a SIM card slot, and is defined as a "physical and electronic housing provided on a device to accommodate a physical SIM card" in GSMA technical specification (TS).37. The MEP-supported eUICC 1-50 is connected to the MEP-supported modem 1-25 through one physical pin, and a profile in the eUICC occupies one baseband in the MEP-supported modem 1-25. Each profile performs communication with the baseband mapped with an eSIM port through one eSIM port. For example, in FIG. 1, profile 1 (1-55) may occupy and use baseband 1 by using eSIM port 1 in an enabled state, profile 2 (1-60) may occupy and use baseband 2 by using eSIM port 2 in an enabled state. In this case, in FIG. 1, the pSIM 1-45 is inserted but there is no connection with the baseband. The ISD-R 1-65 is an entity in the eUICC, which can be selected by only the LPA 1-15 or the modem 1-25, and may respond when receiving a command from the LPA 1-15 or the terminal 1-05 by storing information on a state and a configuration of metadata of the profile or the profile in the eUICC or collecting the same through an eUICC internal operation. For example, a case where a profile management command such as GetProfileInfo( ) is received as an ISD-R selection command APDU or an APDU message may be included. The LPA 1-15 corresponds to software operating on the terminal framework 1-20, and a function of the LPA 1-15 may be integrated as a part of the terminal framework 1-20. A message transmitted from the LPA 1-15 to the eUICC 1-50 goes through the terminal framework 1-20 and the modem 1-25 and is finally transmitted 1-20 to the eUICC 1-50, and the eUICC 1-50 having received the corresponding message identifies an ES10x command from the APDU transmitted from the LPA 1-15 and performs an eUICC profile management operation.

For convenience of description, FIG. 1 illustrates a case where there are two profiles, profile 1 and profile 2, in the eUICC 1-50, but the disclosure is not limited thereto, and thus, it should be noted that there may be more profiles according to the memory capability of the eUICC 1-50, and there may be two or more profiles in an enabled state. In a case of an MEP-supported eUICC, profile 1 1-55 and profile 2 1-60 may be simultaneously enabled, and in a case of an MEP-unsupported eUICC, only one of profile 1 1-55 and profile 2 1-60 may be in the enabled state. The ISD-R 1-65 generates a new ISD-P (indicating a security domain for profile hosting), and stores necessary eUICC data and service (for example, local profile management, profile information, etc.) required by the LPA function as described above, or collecting the same in the eUICC to provide the same to the LPA.

For convenience of description, although not illustrated for the eUICC 1-50 of the terminal 1-05 in FIG. 1, an embedded UICC controlling authority security domain (EC-ASD), an eSIM management platform, etc. corresponding to a space storing credentials required by security domains of the eUICC, for example, a certificate issuer's root public key, an eUICC manufacturer's keyset, etc. for verification of the SM-DP+ certificate may be included.

The terminal framework 1-20 means a terminal operating system and exists among the modem, other terminal system, the normal app, and the LPA. The terminal framework 1-20 may acquire information on the eUICC from the modem 1-25 and carry the information, and may respond with the corresponding information when the information on the terminal or the eUICC is required by the normal app or the LPA. The terminal framework 1-20 may generate a command APDU according to a channel open command or a port open command received from the normal app or the LPA to transmit the same to the modem, and may receive a response message to the corresponding APDU from the modem to transfer the same to the normal app or the LPA again. In addition, the terminal framework 1-20 may receive channel.transmit (command APDU) invoked from the normal app or the LPA and transfer the same to the normal app or the LPA in a format of channel.transmit (response APDU).

As described above, the SM-DP+ server 1-70 indicates a server including a function of generating a profile, encrypting the generated profile, generating a profile remote management command, or encrypting the generated profile remote management command, or including a function of supporting enabling of multiple profiles of the terminal.

Figure 2:
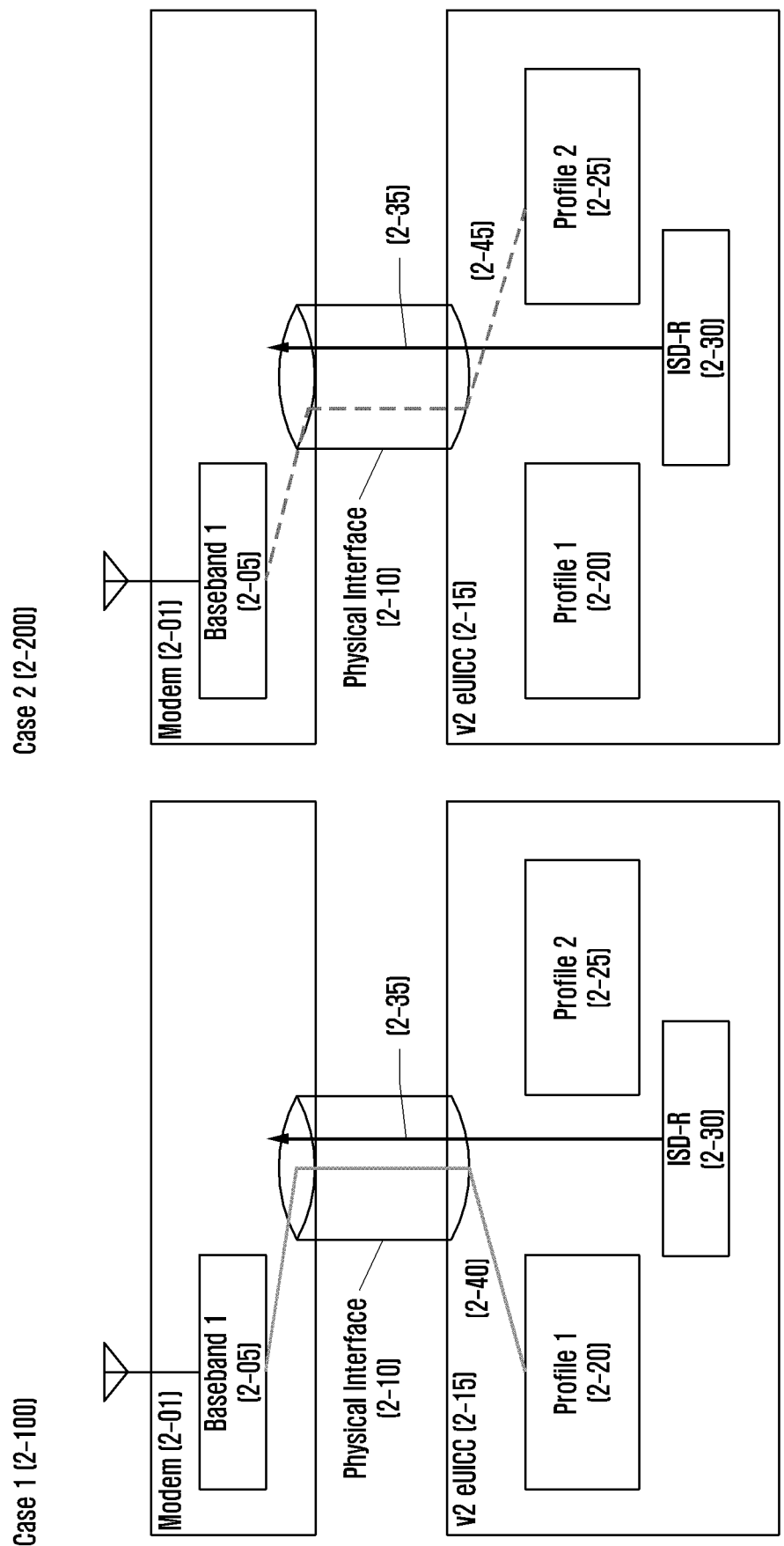
FIG. 2 schematically illustrates an example of connection between a modem and an MEP-unsupported current v2 embedded universal integrated circuit card (eUICC) in a wireless communication system according to an embodiment of the disclosure.

FIG. 2 schematically illustrates an example of connection between a modem and an MEP-unsupported current v2 embedded universal integrated circuit card (eUICC) in a wireless communication system according to an embodiment of the disclosure.

In the conventional v2 eUICC, only one profile can be enabled in the eUICC, and can only perform local profile management of a user, without involvement of the SM-DP+ to process enabling/disabling/deletion/updating, etc. of a pre-installed profile. In a case of an MEP-unsupported modem 2-01, there may be one or more basebands in consideration of a case where a physical SIM card and the eUICC are simultaneously used, etc., but in order to avoid obscuring the focus of the disclosure, a description is made assuming that there is only one baseband. In a process of initialization between the terminal and the eUICC, the modem 2-01 may identify a maximum number of openable channels through answer to reset (ATR) information received from the eUICC, and the existing maximum 20 (0 to 19) channels may be generated. In a process of initialization between the modem and the eUICC, the modem may generate a channel for transmitting an APDU by selecting the ISD-R in the eUICC, through a MANAGE CHANNEL open channel, and thereafter, when a request for a channel open from the terminal framework at a specific time point is received, the modem may additionally open each independent channel for processing APDU transmission between the ISD-R and the LPA or processing the profile between the application and the eUICC and transmit the APDU. In the conventional art, only one physical interface is used between the modem and the card, and thus, in the corresponding interface, the modem may apply an independent channel to process APDU transmission to an endpoint between specific applets in the profile between the application and the eUICC or between the LPA and the ISD-R, so as to process the APDU transmission.

In the eUICC up to v2 eUICC 2-15, there may be only one profile capable of performing simultaneous enabling. One enabled profile such as Case 1 2-100 or Case 2 2-200 may occupy one baseband 2-05 of the modem 2-01, and when refresh proactive command transmission is needed for the modem 2-01 in the enabled modem of the eUICC 2-15, the modem 2-01 may transmit the APDU through a channel pre-allocated to an app ID of the corresponding profile. For example, in Case 1 2-100, a USIM application of profile 1 2-20 may transmit the APDU through predetermined channel #0 2-40 allocated by the modem with baseband 1 2-05.

When the ISD-R 2-30 receives, from the LPA, a request for a profile state change, for example, an ES10c.EnableProfile (profile 2) request for a state change from Case 1 2-100 to Case 2 2-200, or a reset of an eUICC memory, the ISD-R 2-30 may transmit 2-35, to the modem 2-10, a proactive command including the UICC reset and/or the profile state change (the eUICC profile state change) through a REFRESH proactive command to process data deletion of the previously cached profile and/or to restart an application session. In this case, the ISD-R 2-30 may transmit a response APDU notifying that there is a proactive command, through a response value to the APDU transmitted from the modem 2-01 to the ISD-R 2-30, and the modem 2-01 may receive the response APDU, send a FETCH APDU command through a basic channel, and respond with the proactive command for the UICC reset or the profile state change (the eUICC profile state change) to the body text of the response APDU of the corresponding message. When the state change from Case 1 2-100 to Case 2 2-200 has been completed, in Case 2 2-200, a USIM application of profile 2 2-25 may transmit the APDU through a predetermined channel 2-45 allocated by the modem with baseband 1 2-05.

Figure 3A:
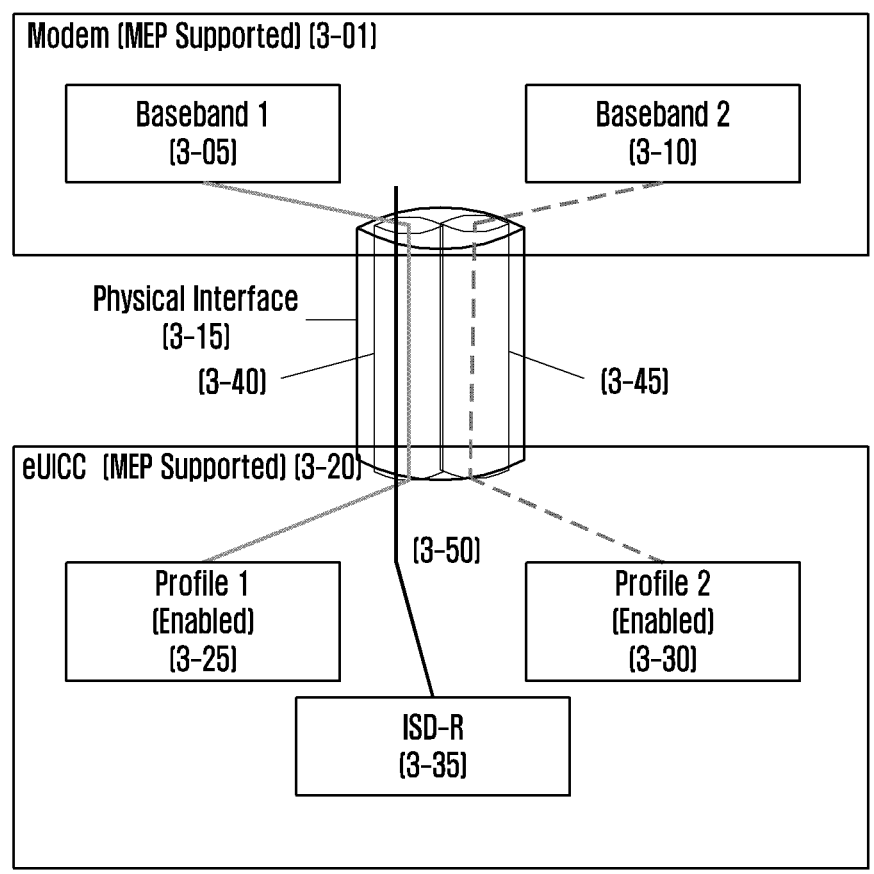
FIG. 3A illustrates an ISD-R access method between an eUICC and a modem according to introduction of the concept of a virtual interface in a wireless communication system according to an embodiment of the disclosure.
Figure 3B:
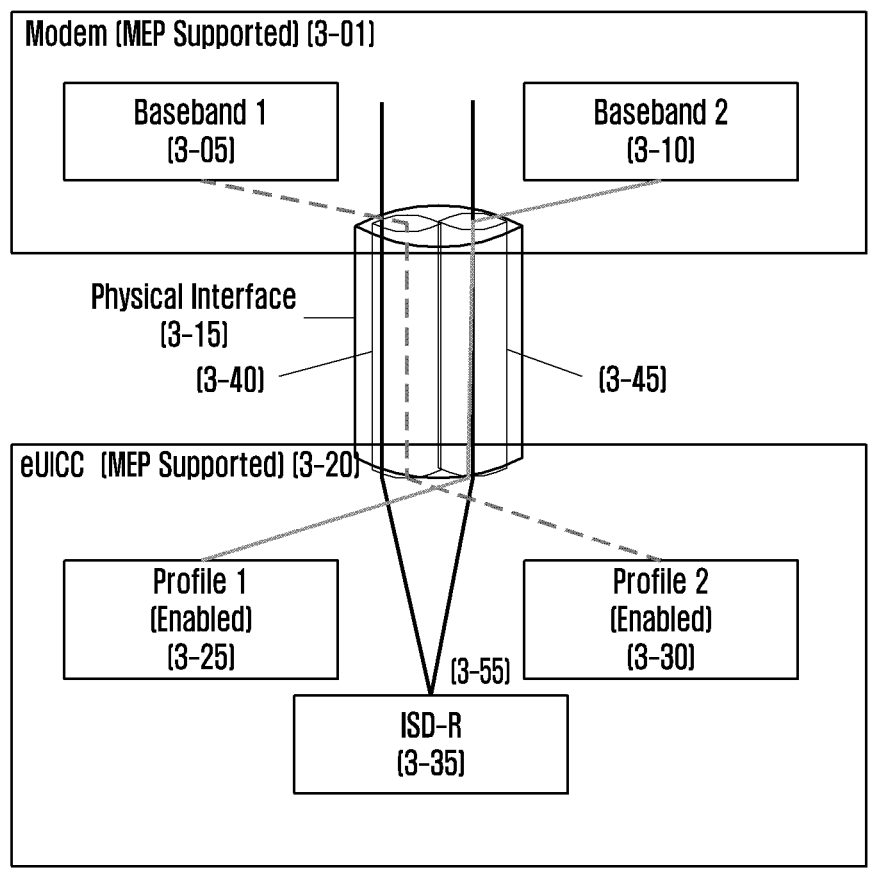
FIG. 3B illustrates an ISD-R access method between an eUICC and a modem according to introduction of the concept of a virtual interface in a wireless communication system according to an embodiment of the disclosure.
Figure 3C:
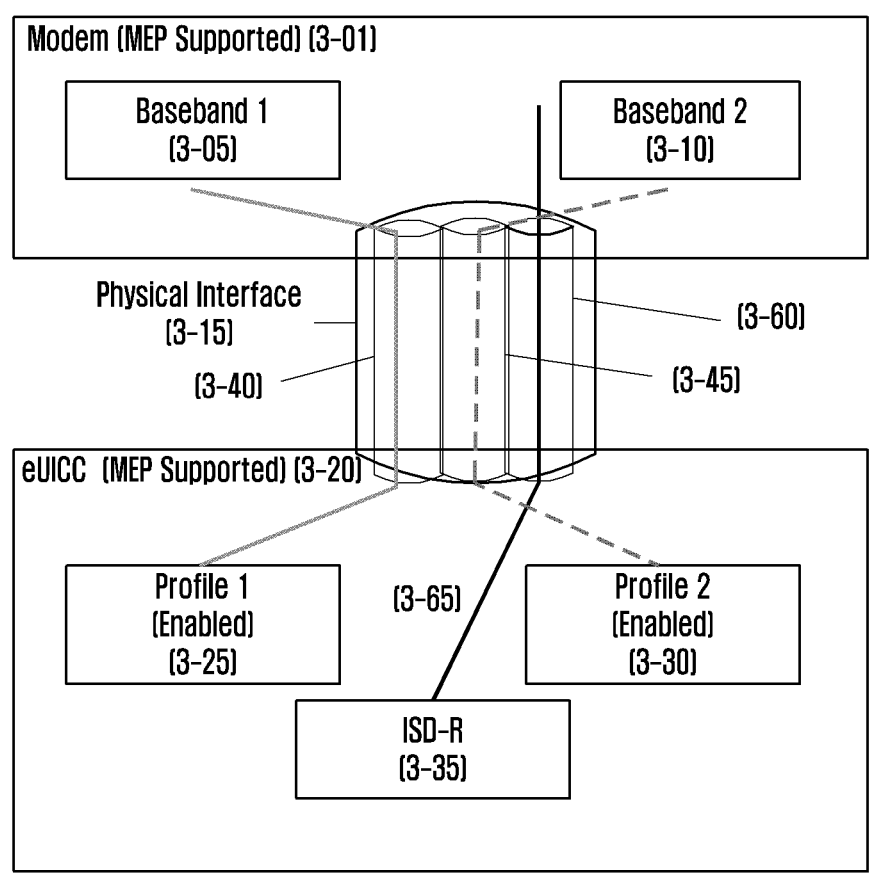
FIG. 3C illustrates an ISD-R access method between an eUICC and a modem according to introduction of the concept of a virtual interface in a wireless communication system according to an embodiment of the disclosure.

FIGS. 3A to 3C illustrate an ISD-R access method between an eUICC and a modem according to introduction of the concept of a virtual interface in a wireless communication system according to an embodiment of the disclosure.

For convenience of description, in FIGS. 3A to 3C, an eUICC 3-20 is considered as an eUICC supporting an MEP function capable of simultaneously enabling multiple profiles. A modem 3-01 is also considered as a modem supporting the MEP function. FIGS. 3A to 3C are described with an example of a situation in which there are two profiles (profile 1 3-25 and profile 2 3-30) enabled with two basebands (baseband 1 3-05 and baseband 2 3-10), and mapping between an eSIM port and a baseband in a modem 3-01 can be switched, but to avoid obscuring the focus, in FIG. 3A 3-100 to FIG. 3C 3-300, a description on mapping of logical terminal endpoints in the modem 3-01 is made to be limited to mapping between baseband 1 3-05 and channel 1 3-40 and mapping between baseband 2 3-10 and channel 2 3-45.

The eUICC 3-20 supporting the MEP may enable multiple profiles, and each enabled profile may occupy and use a specific baseband of the modem. In the MEP, two or more profiles can be simultaneously enabled, and thus, the concept of a logical interface for transmitting an APDU by multiplexing an existing physical interface 3-15 and dividing the same according to the enabled profile may be introduced. Hereinafter, for convenience of description, the corresponding logical interface is called an eSIM port, and the eSIM port is divided into eSIM port #1 3-40, eSIM port #2 3-45, and eSIM port #0 3-60 and described.

As a result of the initialization between the terminal and the card, a port for transmitting the APDU between the modem and the eUICC and a transmission channel in the port may be generated, and in this case, an eSIM port ID mapped to each baseband may be configured. The corresponding port ID may be configured in the modem or a terminal platform and transferred to the LPA. For convenience of description, the port ID and a port number are exchangeable used in the discourse. The modem may open a greater number of eSIM ports than the number of basebands, and the number of eSIM ports utilized in the eUICC 3-20 may be equal to or smaller than the number of profiles which can be simultaneously enabled in the corresponding eUICC. The profile may transmit or receive an APDU message to or from the terminal by using one of the corresponding eSIM ports and transmit a proactive command to the modem.

In the example of FIGS. 3A to 3C, the modem 3-01 may transmit an APDU command to enabled profile 1 3-25 through eSIM port #1 3-40. Profile 1 3-25 may transmit a related proactive command which may affect baseband 1 3-05 through eSIM port #1 3-40. The modem 3-01 may transmit an APDU command to enabled profile 2 3-30 through eSIM port #2 3-45. Profile 2 3-30 may transmit a related proactive command which may affect baseband 2 3-10 through eSIM port #2 3-45.

As shown in Case 1 3-100 in FIG. 3A, Case 2 3-200 in FIG. 3B, or Case 3 3-300 in FIG. 3C to be described below, the terminal (the modem or the LPA) may configure an eSIM port for transmitting the APDU to the ISD-R, by using one of three cases below:

Case 1 3-100 in FIG. 3A: The ISD-R 3-35 is selected through one of the eSIM ports (hereinafter, Case 1 in FIG. 3A is described as a dedicated port). An eSIM port used by the ISD-R 3-35 shares a port with the profile, but uses a single independent channel in the port. In this case, for example, the LPA or the modem transmits or receives the APDU to or from the ISD-R 3-35 through only a channel 3-50 allocated to the ISD-R 3-35 in port #1 3-40.

Case 2 3-200 in FIG. 3B: The ISD-R 3-35 is selected through any eSIM ports occupied by profiles (hereinafter, Case 2 in FIG. 3B is described as any port). An eSIM port used by the ISD-R 3-35 shares a port with a profile occupying the corresponding port, but uses a single independent channel in the port. In this case, for example, the LPA or the modem selects one of channel 3-55-1 allocated to the ISD-R 3-35 in port #1 3-40 and channel 3-55-2 allocated to the ISD-R 3-35 in port #2 3-45 and simultaneously or non-simultaneously transmits or receives the APDU to or from the ISD-R 3-35.

Case 3 3-300 in FIG. 3C: The ISD-R 3-35 is selected through an ISD-R exclusive port, and a port occupied by a profile is not shared with the ISD-R 3-35 (hereinafter, Case 3 in FIG. 3C is described as an exclusive port). The exclusive port exists independently from the eSIM port used by the profile and uses a single channel in the corresponding port. In this case, for example, the modem or the LPA transmits or receives the APDU to or from the ISD-R 3-35 by using a channel 3-65 allocated in an independent ISD-R exclusive port 3-60, and the eUICC should return a profile management command message received through a port other than the ISD-R exclusive port, as an error to the LPA.

An ISD-R access scheme to be selected for transmission or reception of the APDU to or from the ISD-R in the terminal may be determined, as described in FIG. 5 below, in a terminal-eUICC initialization process so that the LPA performs reception through a terminal framework. The determination in the terminal-eUICC initialization process may be made through a performance negotiation between the terminal and the card, may be configured by the eUICC so that the terminal makes determination and informs the eUICC of the same, or may be configured by the terminal so that the eUICC informs the terminal of the same. Alternatively, instead of making determination in the initialization process, the LPA may determine the ISD-R access scheme as a scheme defined in the terminal to be pre-used. This may be a method determined and pre-configured by terminal-eUICC manufacturers during the manufacture of the terminal. Alternatively, the eUICC may be implemented so that the eUICC can perform processing even though the scheme determined by the terminal is unknown.

Figure 4:
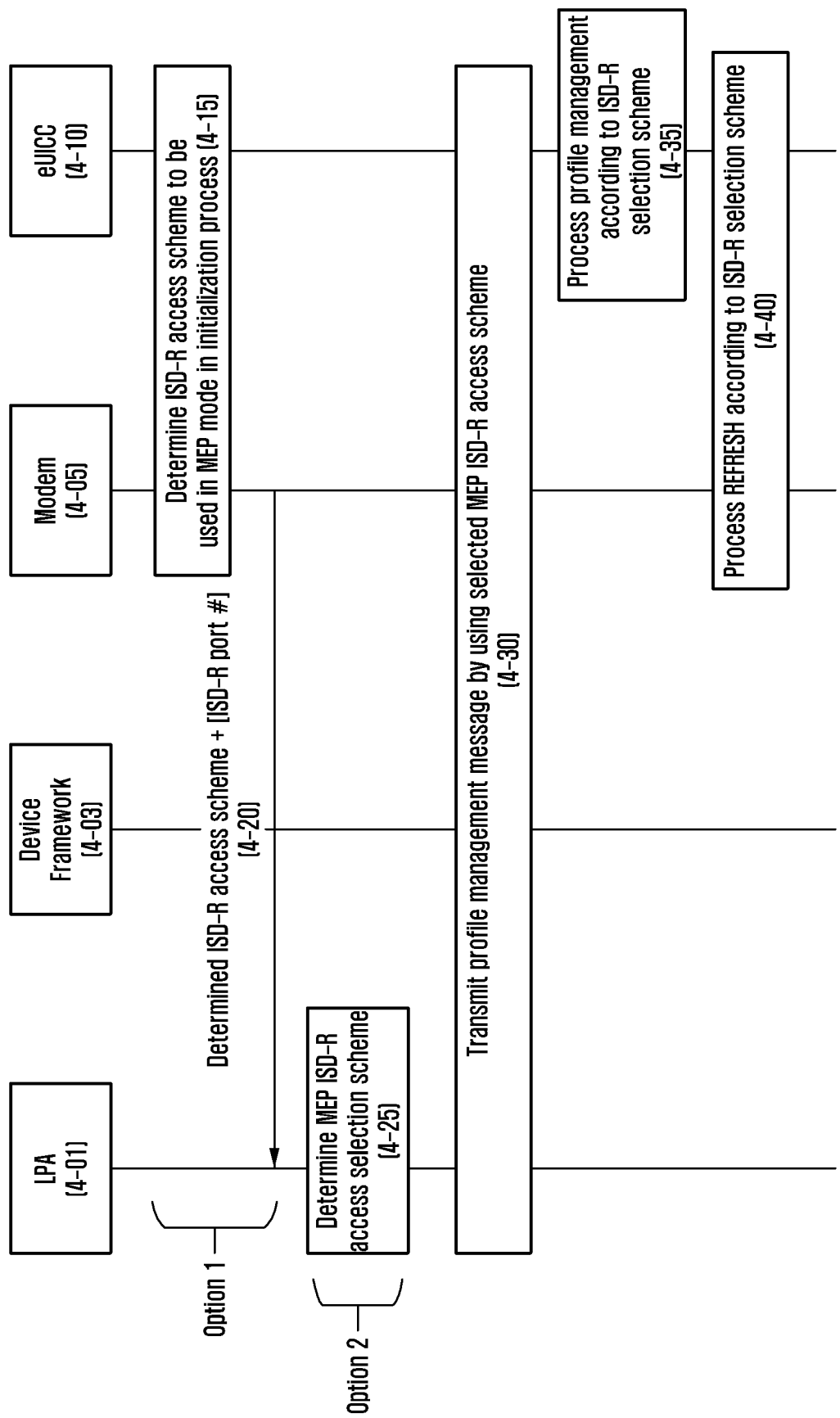
FIG. 4 schematically illustrates a series of operations of determining an ISD-R selection scheme between a terminal and an eUICC and transmitting or receiving a profile management message in a wireless communication system according to various embodiments of the disclosure.

FIG. 4 schematically illustrates a series of operations of determining an ISD-R selection scheme between a terminal and an eUICC and transmitting or receiving a profile management message in a wireless communication system according to various embodiments of the disclosure.

In general, a terminal-card initialization process is as follows. When the eUICC is inserted into the terminal, a modem 4-05 performs activation and cold reset for configuring a management environment for an operation with the eUICC card, such as power supply, clock synchronization, current, and voltage, to recognize the corresponding card and use the corresponding card. Once the management environment configuration for the use of the corresponding card has been completed, the eUICC 4-10 responds to the terminal modem 4-05 with an answer to reset (ATR) message. The answer to reset corresponds to a message first transmitted to the terminal by the card, and maximum 32-byte message blocks are transmitted as a consecutive chain. The eUICC 4-10 should respond to the modem 4-05 by including whether eUICC functionality defined in GSMA SGP.22 is supported in one of message blocks defined by interface bytes, among the message blocks of the ATR message.

The eUICC 4-10 may also respond by including a supported transmission protocol and information on whether the corresponding transmission protocol can be changed, etc. in the corresponding ATR message. The modem 4-05 may determine to use the transmission protocol supported by the card, or may additionally transmit, when the ATR has an identifier allowing a transmission protocol change, a request for transmission protocol and parameter determination to the eUICC 4-10 to make final determination in the modem 4-05 (operation 4-30) through a process of negotiating a transmission protocol to be used between the modem 4-05 and the eUICC 4-10 (operation 4-25). The terminal and the card may transmit an application protocol data unit (APDU) message by using one of T=0 and T=1 corresponding to transmission protocols defined in ISO 7816-3, through operation 4-30 above. The APDU corresponds to a data unit including a pair of a command and a response, and is used to process a message between one application and another application.

When the answer to request is received, a card session is generated between the terminal and the card, and from this moment, APDU transmission or reception between the terminal and the modem can be performed.

In general, the modem 4-05 performs a process of transmitting an APDU for a select master file (MF) and identifying file control parameters for a highest file system, which exist in the eUICC.

In addition, the modem 4-05 transmits the APDU for terminal capability to the eUICC 4-10 by including eUICC-related terminal capability defined in SGP.22, such as whether the corresponding terminal supports LPA and whether an enterprise function is supported. The eUICC 4-10 having received the message may recognize that the corresponding terminal corresponds to a terminal supporting the eUICC, adjust a configuration value in the eUICC accordingly, and respond to the modem 4-05 by responding with status word (SW)1=9X and SW2=XX as a normal response code for the APDU command (operation 4-40).

In addition, in the modem-card initialization process, the modem may transmit the APDU for channel generation when additional information reception from the ISD-R of the eUICC 4-10 is required, and transmit an APDU command for the Select ISD-R in the generated channel so as to select the ISD-R. When the terminal selects the ISD-R, the ISD-R may provide the terminal with additional information including whether there is a profile enabled as ISDR ProprietaryApplicationTemplate, as a response value for the selection.

The modem 4-05 having received information from the eUICC above may transfer information acquired from the eUICC to a terminal framework 4-03 so that the information can be provided to be utilized in a terminal application or system. The modem 4-05 may sequentially or integrally transmit information acquired at a specific time point after a time point at which the information is acquired from the eUICC 4-10.

Once the terminal and the modem establish the card session above, APDU transmission or reception between the terminal and the modem may be performed, and the modem may then transmit the APDU command for SELECT MF, Terminal Capability, and Manage Channel in the initialization process at a specific time point later. It should be noted that an APDU to be transmitted first without following the sequence above may vary upon the determination of the terminal.

The modem and the eUICC may determine an operation in an MEP modem and an ISD-R access scheme (operation 4-15) in the terminal-card initialization process, and embodiments below may be included. In addition, in the process (operation 4-15) of determining the ISD-R access scheme, identification information indicating whether selection of a port to be used during enabling of a profile is made by the LPA or the eUICC may be additionally included and provided, and accordingly, a port selection scheme may also be determined together.

1. Determining ISD-R access scheme through capability negotiation between terminal and eUICC.

A. The terminal may transmit, to the eUICC, terminal capability information or predetermined information on whether the MEP is supported, by including the ISD-R access scheme, through a port management APDU command, and this may be represented as information constituting eUICC-related capability of terminal capability. For example, bit(s) of bytes constituting eUICC-related capability (Tag 83) of the terminal capability may be indicated. In a case of supporting one or more schemes, the terminal may inform of the same by including an additional bit indicating the same.

Example) eUICC-Related Device Capabilities Byte 2

| b8 | b7 | b6 | b5 | b4 | b3 | b2 | b1 | Meaning |
|----|----|----|----|----|----|----|----|---------|
| — | — | — | — | — | — | — | 1 | ISD-R access mode - Exclusive Port supported |
| — | — | — | — | — | — | — | 0 | ISD-R access mode - Exclusive Port not supported |
| — | — | — | — | — | — | 1 | — | ISD-R access mode - Any Port supported |
| — | — | — | — | — | — | 0 | — | ISD-R access mode - Any Port not supported |
| — | — | — | — | — | 1 | — | — | ISD-R access mode - dedicated Port is supported |
| — | — | — | — | — | 0 | — | — | ISD-R access mode - dedicated Port is not supported |
| — | — | — | — | 1 | — | — | — | Multiple Logical Interface is supported |
| — | — | — | — | 0 | — | — | — | Multiple Logical Interface is not supported |
| — | — | — | 1 | — | — | — | — | MEP is supported |
| — | — | — | 0 | — | — | — | — | MEP is not supported |

B. The eUICC may transmit predetermined information on whether the MEP is supported, to the modem by using one or a combination of response values for the message below transmitted by the terminal in the initialization process, and in this case, the eUICC 4-10 may respond with one of messages below by including the ISD-R access scheme and additionally including a port selection scheme.

i. Answer to reset (ATR) corresponding to a response value for activation and cold reset
  ii. A file control parameter (FCP) template corresponding to a response value of a select master file iii. A response value for terminal capability transmission
iv. An ISD-R proprietary template for a select ISD-R in the terminal
v. A response APDU for port management APDU command for eSIM port management, wherein this message is included and is sent as a response while MEP configuration information is sent as a response, in a case of initialization determination in the MEP mode, the terminal may configure a command APDU for eSIM port management (port open, close, acquisition of answer to reset for the port, a port number change, etc.), and a response value of the eSIM port management message transmitted for the first time after the cold reset may include configuration information of the MEP support of the eUICC.

C. The modem 4-05 may identify whether the same ISRD-R is supported, by receiving a response value for terminal capability, or may transmit an APDU command for acquiring the corresponding information and determine the same from the response value for the APDU command. When the modem 4-05 receives, from the eUICC, information on the ISD-R access scheme before terminal capability transmission, by performing transmission without including the information on the ISD-R access scheme in the terminal capability is performed, or transmission by including an ISD-R access scheme other than the ISD-R access scheme received from the eUICC is performed, so that the use of another access scheme can be informed to the eUICC 4-10. When the modem 4-05 receives, from the eUICC, information on the ISD-R access scheme after the terminal capability transmission, as described above, the modem 4-05 may also transmit data of the command APDU to the eUICC 4-10 to inform of the corresponding supported ISD-R information. When an ISD-R access scheme other than the access scheme supported through information received by the eUICC 4-10 or the modem 4-05 is received and determination is made that there is no scheme commonly supported, the eUICC 4-10 or the modem 4-05 may respond with a value indicating that the corresponding ISD-R selection scheme cannot be supported, and may process initialization in a single enabled profile (SEP) mode to complete the same. It should be noted that there may be no ISD-R access scheme commonly supported because of different ISD-R selection schemes even though both the eUICC 4-10 and the modem 4-05 support the MEP. When the same ISD-R access scheme as the access scheme supported through information received from the modem 4-05 by the eUICC 4-10 or from the eUICC 4-10 by the modem 4-05 is received, that is, when there is a commonly supported scheme, the eUICC 4-10 or the modem 4-05 may respond with the corresponding ISD-R support value and complete the initialization in the MEP mode. As mentioned above, in addition to the ISD-R selection scheme, information for determining a scheme of selecting a port to be used during enabling of a profile may be added as a message exchanged in the initialization process. In this case, identification information indicating the corresponding port selection scheme, for example, an identifier for LPA-based port selection or eUICC-based port selection may be added. When there are two or more commonly supported schemes, the modem or the card may transmit additional information of determination and processing of one of the schemes to be preferentially used, so as to select one scheme. For example, when the eUICC has received information on the support of one or more ISD-R access schemes and there are two or more commonly supportable schemes, the eUICC may perform configuration by selecting one preferred scheme therefrom and respond with the result of the configuration. Alternatively, when the modem has received information on the support of one or more ISD-R access schemes and there are two or more commonly supportable schemes, the modem may perform configuration by selecting one preferred scheme therefrom and respond with the result of the configuration. Alternatively, when the ISD-R access scheme preferred by the terminal or the eUICC is selected and transmitted, and the eUICC or the terminal having received the same is to support a scheme other than the corresponding scheme, one scheme can be determined by responding with information including the corresponding ISD-R support scheme. The initialization in the MEP mode includes preparation made by the terminal so that a port open and a port number can be determined and allocated according to the determined scheme. If the use of the ISD-R exclusive port is determined, the modem should open one more port than the maximum number of available broadbands for the profile and allocate numbers to the corresponding ports. In the disclosure, for convenience of description, a port number in a case of using the ISD-R exclusive port or dedicated port is described as port 0, but the disclosure is not limited thereto, and the port number may be the highest number or the lowest number of the maximum number of ports which can be supported by the eUICC, a predetermined number configured by the modem, or a specific number fixed to be specified as a standard later.

2. Informing eUICC of an ISD-R access scheme by terminal and determining corresponding success scheme by eUICC.

A. As describe above, the terminal may transmit, to the eUICC, terminal capability information or predetermined information on whether the MEP is supported, by including the ISD-R access scheme, through a port management APDU command, and this may be represented as information constituting eUICC-related capability of terminal capability. For example, bits of bytes constituting eUICC-related capability (Tag 83) of the terminal capability may be indicated. In a case of supporting one or more schemes, the terminal may inform of the same by including an additional bit indicating the same.

Example) eUICC-Related Device Capabilities Byte 2

| b8 | b7 | b6 | b5 | b4 | b3 | b2 | b1 | Meaning |
|----|----|----|----|----|----|----|----|---------|
| — | — | — | — | — | — | — | 1 | ISD-R access mode - Exclusive Port supported |
| — | — | — | — | — | — | — | 0 | ISD-R access mode - Exclusive Port not supported |
| — | — | — | — | — | — | 1 | — | ISD-R access mode - Any Port supported |
| — | — | — | — | — | — | 0 | — | ISD-R access mode - Any Port not supported |
| — | — | — | — | — | 1 | — | — | ISD-R access mode - dedicated Port is supported |
| — | — | — | — | — | 0 | — | — | ISD-R access mode - dedicated Port Is not supported |
| — | — | — | — | 1 | — | — | — | Multiple Logical Interface is supported |
| — | — | — | — | 0 | — | — | — | Multiple Logical Interface is not supported |
| — | — | — | 1 | — | — | — | — | MEP is supported |
| — | — | — | 0 | — | — | — | — | MEP is not supported |

As mentioned above, in addition to the ISD-R selection scheme, information on a scheme of selecting a port to be used during enabling of a profile may be added. In this case, identification information indicating the corresponding port selection scheme, for example, an identifier for LPA-based port selection or eUICC-based port selection may be additionally added as the additional bit of the eUICC-related capability of the terminal capability or the management APDU command.

B. The eUICC 4-10 configures an ISD-R access mode with reference to an ISD-R access mode parameter of the terminal. When the eUICC receives information on the support of one ISD-R access scheme, the eUICC may specify and use the corresponding scheme, instead of responding with a result of the configuration. The configuration of the ISD-R access mode may include a configuration of a rule of an ISD-R access to a specific port (configuration of whether several ports allow an ISD-R application ID to access) and/or a profile enabling rule in the corresponding port. In addition, when identification information of the eUICC-based port selection is received through the port selection scheme and a profile management command is received without a port number, as an ES10c.command, the eUICC may recognize that the port needs to be selected and apply the rule for the port selection to process the command later. For example, in FIGS. 9A to 9E, when the ES10c.command is received without a port number, determination and processing may be performed as if there is no "Port Selection by eUICC flag".

3. Informing terminal of ISD-R access scheme by eUICC and determining corresponding access scheme by terminal.

A. The eUICC responds to the terminal with the ISD-R access scheme through one of messages below:
  i. Answer to reset (ATR) corresponding to a response value for activation and cold reset
  ii. A file control parameter (FCP) template corresponding to a response value of a select master file
  iii. An ISD-R proprietary template for a select ISD-R in the terminal
  iv. A response of MEP configuration information including an ISD-R access scheme in a response APDU in response to a command APDU for eSIM port management B. According to the corresponding received ISD-R access scheme, the terminal makes preparation to determine and allocate the number and port numbers of ports to be opened. For example, when an ISD-R exclusive port is determined to be used, for the number of ports to be opened, one more port than the number of ports to be connected for the profile is required, and when there is a port number allocated to the ISD-R exclusive port, the port number is allocated to the ISD-R exclusive port to open the same. When the eUICC receives information on the support of one ISD-R access scheme, the corresponding scheme may be specified and used without a response of the configuration result.

As mentioned above, in addition to the ISD-R selection scheme, information on a scheme of selecting a port to be used during enabling of a profile may be also added. In this case, identification information indicating the corresponding port selection scheme, for example, an identifier for LPA-based port selection or eUICC-based port selection, may be included in one of the above-mentioned messages for providing the terminal with the ISD-R access scheme by the eUICC.

When the ISD-R access scheme is determined in the initialization process, the modem 4-05 may transfer the corresponding received access scheme to a device framework 4-03 so that the LPA 4-01 can acquire the same (operation 4-20). The LPA 4-01 may acquire the corresponding selected scheme from the information received from the device framework to determine a method for accessing the ISD-R or may acquire an ISD-R access method preconfigured by the terminal to determine a transmission method (operation 4-25) and transmit a management message (operation 4-30). For example, when the ISD-R selection scheme corresponds to an exclusive scheme or a dedicated scheme and the port selection scheme corresponds to an LPA scheme in operation 4-20, a port number may be provided to the LPA 4-01 by the device framework 4-03 so that a profile enabling command including the port number can be transferred, and when the port selection scheme corresponds to an eUICC 4-10 selection scheme, the port number may not be provided to the LPA 4-01 by the framework 4-03. The operation of the profile management message transmission (operation 4-30) will be described later in FIGS. 6 and 7 in detail. The eUICC 4-10 having received the corresponding profile management message may process the profile management message according to the ISD-R access scheme (operation 4-35), and this will be described later in FIGS. 8 and 9 in detail. In addition, a method for processing a proactive command (REFRESH (mode)) between the eUICC and the modem for the profile enabling message received without the port number according to the ISD-R access scheme will be described later in FIGS. 10 and 11 in detail.

As mentioned earlier in operation 4-35, in a case of the eUICC that is fixed to the modem and the terminal and is undetachable therefrom, the mutually pre-fixed ISD-R access scheme may be pre-loaded on the terminal (including the modem, the terminal framework, and the LPA) and the eUICC in the same manner through the MEP configuration. In this case, in the terminal-card initialization process, an operation of determining the ISD-R access scheme (operation 4-15) may be skipped.

In the terminal-card initialization process, instead of determining the ISD-R access scheme (operation 4-15) or receiving the corresponding information (operation 4-20), a method in which the LPA determines the ISD-R access scheme and makes determination (operation 4-20) may be also possible. For example, when the LPA determines the ISD-R access scheme through the MEP configuration configured for the terminal, selectively determines the port selection scheme, configures the ES10c.command message, and transmits the same, in addition to the ISD-R access scheme determination, the eUICC 4-10 having received the same may determine profile management message processing with reference to whether there is a port number of an ES10c.command message transmitted by the LPA. In this case, the eUICC may configure file access authority so that the ISD-R can be selected through any port.

Figure 5:
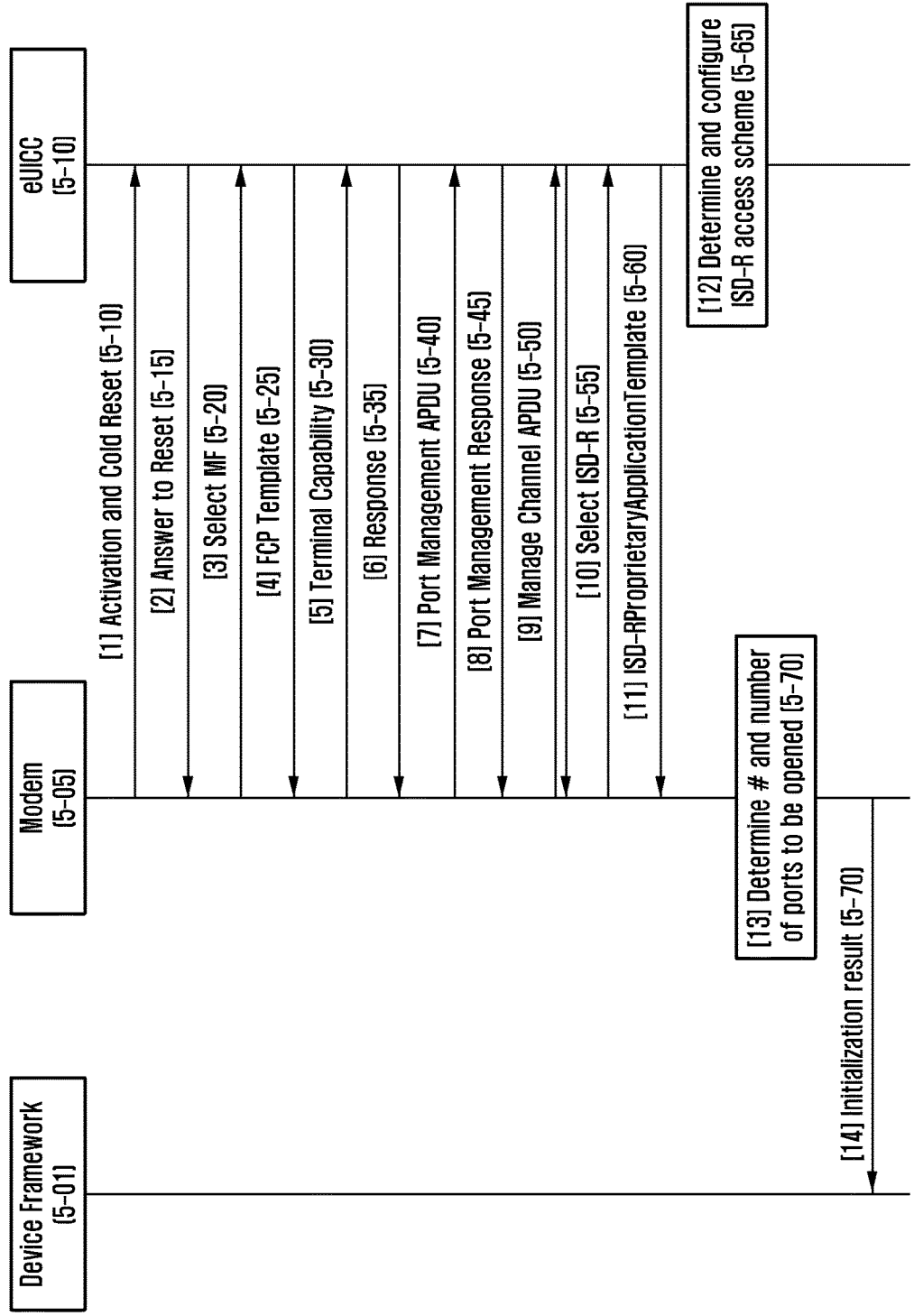
FIG. 5 illustrates the operation of determining the ISD-R access scheme to be used in the MEP mode in the initialization process in FIG. 4, according to an embodiment of the disclosure.

FIG. 5 additionally illustrates the operation (4-15) of determining the ISD-R access scheme to be used in the MEP mode in the initialization process in FIG. 4, according to an embodiment of the disclosure.

In the above-described normal terminal-card initialization process, a terminal 5-05 and a card 5-10 additionally exchange information on whether the MEP is supported and the ISD-R access scheme to determine whether to operate in the MEP mode. As described above, once the eUICC is inserted into the terminal, a modem 5-05 performs, activation and cold reset for configuring a management environment for an operation with the card, such as power supply, clock synchronization, current, and voltage, to recognize the corresponding card and use the corresponding card. Once the management environment configuration for the use of the corresponding eUICC has been completed, the eUICC 5-10 responds to the terminal modem 5-05 with an answer to reset (ATR) message. The answer to reset corresponds to a message first transmitted to the terminal by the card, and maximum 32-byte message blocks are transmitted as a consecutive chain. The eUICC 5-10 should respond to the terminal by including whether eUICC functionality defined in GSMA SGP.22 is supported in one of message blocks defined by interface bytes, among the message blocks of the ATR message (operation 5-20).

Through the corresponding ATR message, the eUICC 5-10 may respond by including a supported transmission protocol (e.g., T=0) and information on whether the corresponding transmission protocol can be changed to another protocol through capability negotiation, etc. The eUICC 5-15 may include, in the information transmitted through the ATR, one or more of pieces of information on whether the MEP is supported, the maximum number of supportable logical interfaces, the ISD-R access scheme, etc. When there is an identifier supporting the eUICC functionality, whether the MEP is supported may be determined by a parameter of whether the MEP is supported or whether the eUICC functionality is supported and whether the logical interface is supported. The maximum number of supportable logical interfaces may be considered the same as the number of eSIM ports when there is an identifier supporting the eUICC functionality.

Although not shown, after the answer to reset, a process of negotiation for protocol and parameter selection (PPS) for a transmission protocol may be performed between the terminal and the card. The PPS is initiated in the terminal, and when the card does not support the PPS or the terminal uses a default parameter, the PPS may not be used. The ISD-R access scheme may be bound to the transmission protocol and determined as, for example, an any port scheme in the T=1-based transmission protocol, and an exclusive scheme in the T=0-based transmission protocol. In this case, when the terminal and the card identify whether the MEP is supported and determine that the same transmission protocol is supported, with reference to the ATR or the PPS, one scheme bound to the transmission protocol may be determined as the ISD-R access scheme.

The modem 5-05 may then determine to use the transmission protocol supported by the card without change, or when the ATR includes an identifier allowing the transmission protocol change, may additionally transmit a request for transmission protocol and parameter determination to the eUICC 5-10, so that the modem 5-05 finally determines the transmission protocol to be used between the modem 5-05 and the eUICC 5-10 through the transmission protocol negotiation. Through the above-described transmission protocol determination, the terminal and the card may transmit an application protocol data unit (APDU) message by using one of T=0 and T=1 corresponding to the transmission protocols defined in ISO 7816-3. The APDU corresponds to a data unit including a pair of a command and a response, and is used to transmit or receive a message between an application of the terminal and an application in the card.

When the answer to request is received, a card session is generated between the terminal and the card, and from this moment, APDU transmission or reception between the terminal and the modem is allowed.

In general, the modem 5-05 may request a return a file control parameter (FCP) template while transmitting 5-20 the APDU for an select master file (MF) to receive an FCP template for a highest file system, which exists in the eUICC. As described above, when information sent as a response in the corresponding FCP template is sent, one or more of whether the MEP is supported, the ISD-R access scheme, the maximum number of supportable eSIM ports (=logical interfaces), the eUICC ID, and a list of ICCIDs of the installed profiles may be included. In addition, when the FCP template is sent as a response, whether a terminal capability APDU is supported may be included, wherein responding with an additional command by including whether a new APDU for port management for the MEP is supported is also possible. When a response is sent by including whether the new APDU for the port management is supported, the modem 5-05 may also combine the information on whether the eUICC is supported, received from the ATR, and information on the whether the new APDU for the port management is supported, so as to determine that the eUICC supports the MEP from the combined information.

The modem 5-05 may transmit 5-30 the APDU for terminal capability to the eUICC 5-10 by including eUICC-related terminal capability defined in SGP.22, such as whether the corresponding terminal supports the LPA and whether an enterprise function is supported. The eUICC 5-10 having received the corresponding message may recognize that the corresponding terminal is a terminal supporting the eUICC, adjust a configuration value in the eUICC accordingly, and respond to the modem 5-05 by responding with status word (SW)1=9X and SW2=XX as a normal response code for the APDU command (operation 5-35). Here, X means a random number, for example, a value such as SW1 SW2=90 00 (no additional data, normal response) or 91 XX (additional data, normal response). The eUICC-related terminal capability data may include one or more pieces of the above-described information among whether the LPA is supported, whether the enterprise function is supported, an additional ISD-R access scheme, the maximum number of supportable eSIM ports, whether the MEP is supported, and the parameter for the port selection scheme. While responding with SW1 SW2, the eUICC may also respond with a response message including predetermined information on the MEP configuration, as additional information. This may be one of the ICCID for PPR1 profile, an eSIM port number having an enabled profile, an ISD-R access scheme, and a port selection scheme.

In only a case where the MEP-supported terminal determines that the eUICC supports the MEP through a response value for the terminal capability or the ATR or the FCP template, when the MEP-supported modem 5-05 supports an APDU command for port management, the modem may transmit a port management ADPU for acquisition of the MEP configuration to the eUICC (operation 5-40) and also transmit the corresponding command by including the ISD-R access scheme in the command. As a response value for the corresponding command, the eUICC 5-10 may also perform transmission (operation 5-45) by including one or more pieces of information among a supportable ISD-R access scheme, a maximum number of supportable eSIM ports, a port having an enabled profile, an ICCID list of enabled profiles, an eUICC ID, a PPR1 profile, and a port selection scheme.

In the disclosure, the ISD-R access scheme may correspond to one of schemes of transmission through any port, a dedicated port, and an exclusive port, as described in FIGS. 3A to 3C above. The ISD-R access scheme may be determined through a port number to be used for a dedicated port or exclusive port, a port number to be used for a dedicated port or exclusive port and whether simultaneously enabling profiles is possible, or a port number which cannot simultaneously enable profiles. In addition, the ISD-R access scheme may be indicated by a specific number mapped to the ISD-R access scheme. This may be a value, for example, Exclusive Port=1, Any Port=2, and Dedicated=3.

In the modem-card initialization process, when the modem requires to receive additional information from the ISD-R of the eUICC 5-10, the modem may transmit an APDU for channel generation (operation 5-50) and transmit an ADPU command for the select ISD-R in the generated channel to select the ISD-R (operation 5-55). When the terminal selects the ISD-R, the ISD-R may provide the terminal with information including one or more pieces of information such as whether there is a profile enabled as ISDR ProprietaryApplicationTemplate, an ISD-R support scheme, a port number having an enabled profile, a port number having enabled an PPR1 profile, and a port selection scheme, as a response value for the selection (operation 5-60).

The modem 5-05 may determine, in the terminal-card initialization, whether the MEP is supported (a combination of an eSIM port support+an eUICC support) from the eUICC, the maximum number of supportable eSIM port numbers, and the number and port numbers of eSIM ports to be opened at a specific time point after the supportable ISD-R access scheme is received and before the ISD-R is selected in the maximum two or less ports (operation 5-70). Operation 5-60 may be a specific time point before the reception. For example, when the modem has received all the corresponding information through the ATR, the modem may determine to open a port at a specific time point after the ATR reception and may determine a port number to be opened. When the use an ISD-R exclusive port is determined, the modem may determine the number of ports to be opened by determining that at least one more port than the number of ports having enabled profiles should be generated in the eUICC. In addition, when a port number to be used as an exclusive port is specified and received, or a specific port is determined to be the corresponding port as a standard, the port number specified as the exclusive port may be allocated to the corresponding ISD-R port.

When the eUICC 5-10 acquires information on the ISD-R access scheme from the terminal through the terminal capability reception or the port management APDU, a configuration on profile enabling authority and ISD-R access to the port may be determined by the corresponding access scheme. Even though the ISD-R access scheme is an exclusive or dedicated scheme, the eUICC may selectively allow ISD-R application ID access authority. However, the profile enabling authority should be specified as "enabling impossible" in a case of the exclusive scheme, and is to be specified as "enabling possible" in a case of the dedicated scheme.

1. When an ISD-R access scheme is an exclusive scheme:
   Allow ISD-R application ID access only in an exclusive ISD-R port, and prohibit profile enabling authority
2. When an ISD-R access scheme is a dedicated scheme:
   Allow ISD-R application ID access only in a dedicated ISD-R port, and allow profile enabling authority
3. When an ISD-R access scheme is any port scheme:
   Allow ISD-R application ID access for all ports, and allow profile enabling authority The modem 5-05 having received the information from the eUICC above may transfer the information acquired from the eUICC to a terminal framework 5-01 so that the information can be provided to be utilized in a terminal application or system (operation 5-70). The modem 5-05 may sequentially or integrally transmit, to the inside of the terminal, information configured by the modem in relation to the information acquired from the eUICC at a specific time point after a time point at which the information is acquired from the eUICC 5-10. The corresponding information may include one or more of an ISD-R access scheme, a port number having an enabled profile, baseband radio access technology information mapped to the port number, a port number to be used as an ISD-R transmission port, and port selection schemes.

As described in FIG. 4 above, when the modem 5-05, the eUICC 5-10, or both of the modem and the eUICC determine that ISD-R access schemes supported by the modem 5-05 and eUICC 5-10 are different from each other, based on the received information, the terminal-eUICC may complete the initialization in the SEP mode. When the initialization is performed in the SEP mode, the terminal may complete the initialization in the SEP mode without additionally performing an operation of determining the number and port numbers of ports to be opened.

Figure 6:
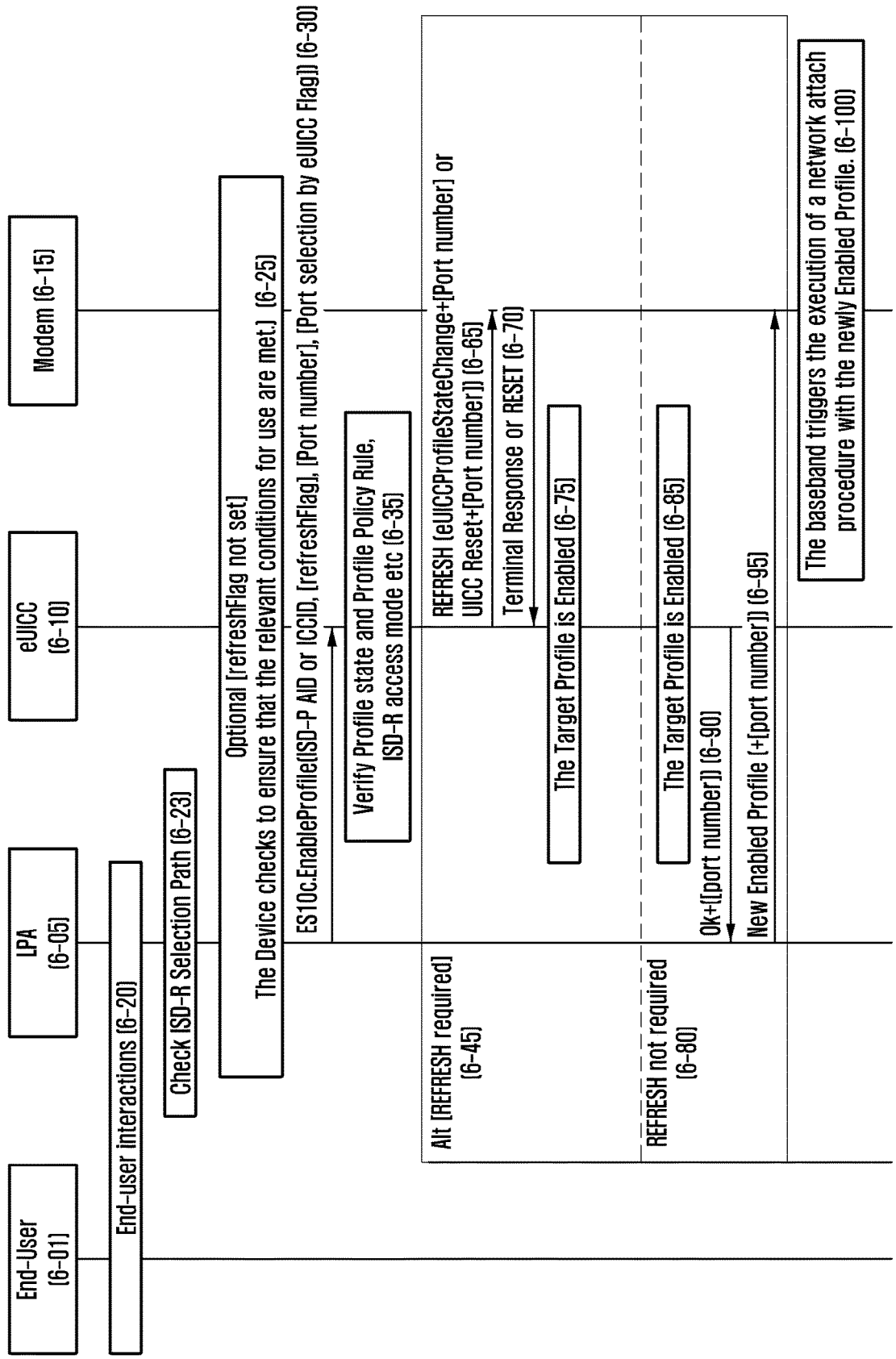
FIG. 6 illustrates an example of the sequence indicating a method for processing local profile enabling in a terminal to which the disclosure is applied.

FIG. 6 illustrates an example of the sequence indicating a method for processing local profile enabling in a terminal to which the disclosure is applied.

As described above, the v2 eUICC not supporting the MEP function is designed to enable only one profile, and thus, when there is an existing enabled profile, the existing enabled profile should be switched to a disabled state for enabling another profile. However, when the eUICC supporting the MEP function processes a profile enabling command, a case where another currently enabled profile should not be disabled may occur according to the position of an eSIM port for enabling the profile. For example, when there are eSIM port 1 and eSIM port 2 in the eSIM, profile 2 is currently enabled in eSIM port 2, and profile 1 is additionally enabled in eSIM port 1, profile 2 that is currently enabled in eSIM port 2 should not be disabled. In addition, when the terminal has a baseband supporting different radio access technologies (RATs), a radio access technology (RAT) providable through the corresponding profile may vary according to a baseband to which the eSIM port is matched, and thus, information allowing a user or a server (during RPM) to determine an eSIM port to which a profile to be enabled is matched needs to be provided. For example, in a case where eSIM port 1 is matched to a baseband supporting a 4G network and eSIM port 2 is matched to a baseband supporting a 5G network, when a user or a server performing remote management is aware of the information, it may be helpful to select a proper eSIM port for enabling a specific profile.

The number of profiles simultaneously enabled to the eUICC at a specific time point may be limited to be equal to or smaller than the number of eSIM ports allocated by the eUICC. When enabling the profile through the user or the SM-DP+ is desired, the eUICC may respond to the SM-DP+ server or the LPA with the number of currently enabled profiles and a maximum number of profiles which can be enabled on the eUICC in consideration of the number of eSIM ports.

The LPA or the terminal software may utilize the information transferred from the eUICC (e.g., the number of eSIM ports allocated by the eUICC) as predetermined information for notifying the user of a need for disabling of the currently enabled profile. FIG. 6 illustrates the sequence of a procedure of enabling a profile, as an example of a method for managing a profile by a user 6-01 through an LPA 6-05 in an MEP-supported terminal. FIG. 6 illustrates a case where eUICC 6-10, a modem 6-15, and the LPA 6-05 support the MEP.

An end user 6-01 performs an enabling command for a profile installed in the terminal, through information displayed on the LPA 6-05 or an application integrated with the LPA 6-05 (operation 6-20). In the LPA or the corresponding implementation app 6-05 of the terminal, the user may indicate, in addition to a list of profiles installed in the eUICC and current state information of the corresponding profile, information including a radio access technology providable for each baseband of the terminal modem by the terminal, eSIM port information matching to the corresponding baseband for APDU transmission, an occupancy state of the profile of the corresponding port from the eUICC, etc. In this case, the LPA may identify profile policy rules of the profile to additionally show an alert message such as profile enabling impossible, to the end user 6-01. When the user 6-01 determines to enable a specific profile, for example, profile 3, by selecting the same, through the information displayed on the screen, the LPA identifies an ISD-R access scheme to determine a port through which a profile enabling command is transmitted (operation 6-23). The corresponding determination may be already made in an operation 6-20 before occurrence of end-user interaction. The determination may be made by receiving, by the LPA, a scheme determined in the initialization process as described in FIG. 4 above, or may be made by identifying, by the LPA, information pre-configured to the terminal (including the LPA).

Once the profile enabling is determined, the LPA 6-05 may transmit, to the eUICC, an ES10c.EnableProfile (issuer security domain—profile application ID (ISD-P AID) or ICCID (Profile ID), [refreshFlag], [Port number], and [Port selection by eUICC flag]) 6-30 command for profile enabling. The port number may be included or may not be included to be transmitted according to the ISD-R access scheme. In this example, a profile to be enabled is randomly described as profile 3.

The LPA may configure and transmit an enabling message in the ISD-R access scheme determined through the terminal-card initialization process or pre-configuration. This may be, for example, a method below.
1. When transmission is performed in an exclusive ISD-R port access scheme: Perform transmission by including a port number
2. When transmission is performed in a dedicated ISD-R port access scheme: Perform transmission by including a port number
3. When transmission is performed in an any port access scheme: Perform transmission without a port number When the LPA performs transmission by using a dedicated port or any port, the eUICC may inform that one port is to be randomly selected and enabled. This may be an additional indicator (for example, Port selection by eUICC flag), or this may be informed by specifying a port number to be transmitted and sent with a specific value such as −1, and transmitting the same. When the LPA performs transmission in an exclusive ISD-R port access scheme, the LPA may transmit an indicator indicating that one port is to be randomly selected and enabled, to the eUICC, without a port number, or may perform transmission by including an additional separate indicator (for example, Port selection by eUICC flag). The disclosure indicates that the separate indicator is a Port selection by eUICC flag, but it should be noted that the indicator may be indicated by other names. The determination of message processing of the eUICC according to whether the port number is included and a combination of ISD-R access schemes will be described in FIGS. 9A to 9E below in detail with an example.

The refreshFlag is additionally set and transmitted when a REFRESH proactive command is required. If the refreshFlag is not configured and the terminal has an existing enabled profile, a condition for use of the enabled profile in the MEP, such as termination of an application session for a port occupied between the UICC and the modem and a local channel close, should be met through terminal implementation (operation 6-25). When the eUICC 6-10 receives the corresponding profile enabling command from the LPA 6-05 (operation 6-30), the eUICC performs a disabling process when there is a profile (referred to as profile 1) occupying the corresponding port, and performs enabling processing through the port. In operation 6-35, the ISD-R of the eUICC 6-10 may identify profile policy rules (PPRs) and enabled states of the existing profiles installed in the eUICC and profile 3 to be enabled, so as to comprehensively determine whether corresponding profile 3 can be enabled, and may respond to a user with an error message when the enabling is impossible. When a port occupied by the existing profile is to be used for the eUICC for enabling profile 3, while the eUICC 6-10 supporting the MEP determines whether corresponding profile 3 is enabled (operation 6-35), the eUICC may determine that the state of the profile is changed to disabled by specifying the corresponding port as profile 1 that has been used, and the state of profile 3 is changed to enabled. If profile 3 occupies an empty port, the eUICC 6-10 supporting the MEP may proceed with the process without performing a process of disabling another profile in the eUICC. The eUICC may transmit the REFRESH proactive command to the modem (operation 6-65) to request profile state change processing. In addition, the eUICC 6-10 supporting the MEP determines a port through the ES10c.command is received in operation 6-35, and when the ISD-R access scheme is not satisfied, the eUICC may reject the corresponding message processing and return an error to the LPA. In other words, when reception is performed through a port that is not allowed by a configured ISD-R access scheme, an error should be returned. For example, when an exclusive or dedicated port is used, an ES10c.command received through another port may be rejected. Alternatively, even though the ES10c.command is received through another port according to a configuration, the eUICC may allow the command instead of rejecting the same. When the eUICC is unaware of the ISD-R access scheme supported by the terminal because there is not pre-negotiated scheme such as a scheme determined through the initialization process or a pre-configured scheme, the eUICC should allow the ISD-R to be selected through any port.

Before processing the profile enabling command, the eUICC may determine parameters of the ES10c.EnableProfile and perform processing below.

When the eUICC is unaware of the ISD-R scheme supported by the terminal:
1. When configuration is made so that an enabling message optionally includes a port number
   A. When there is a port number, perform enabling processing by using the port number regardless of a transmission port
   B. When there is no port number, perform enabling processing by using the transmitted port number
   C. When there is no port number and there is an indicator for eUICC port selection, such as a Port Selection by eUICC flag, the eUICC performs enabling processing by using one available port and responds to the terminal with the port number D. When there is no Port Selection by eUICC flag but there is a request for a random port configuration such as port number −1, perform enabling processing by using an available port and respond to the terminal with the port number
2. When configuration is made so that an enabling message always includes a port number
A. When there is port number, perform enabling processing by using the port number regardless of a transmission port
B. When there is no port number, perform processing as reject
C. In an exceptional case, when there is a port number but there is a Port Selection by eUICC flag, the eUICC performs enabling processing by using one port by the eUICC itself and responds to the terminal with the port number
D. When there is no Port Selection by eUICC flag but there is a request for random port configuration such as port number −1, the eUICC performs enabling processing by using an available port and responds to the terminal with the port number.

When there is a mutually supported scheme and there is an ISD-R scheme pre-configured or configured through the terminal-card initialization:

1. When an exclusive ISD-R port is selected:
A. When there is a port number, perform processing by using the corresponding port but, when a port number=an exclusive ISD-R port number, perform processing as reject
B. When there is no port number
  i. When there is a Port selection by eUICC flag, perform enabling processing by using an available port remaining after excluding the ISD-R port and respond to the terminal with the port number used for the enabling
  ii. When there is no Port selection by eUICC flag, reject or perform enabling processing by using an available port remaining after excluding the ISD-R port according to the configuration and respond to the terminal with the port number used for the enabling
2. When any port is selected:
A. When there is no port number, perform enabling processing by using the corresponding transmission port
B. When there is a port number and the port number is identical to a port of the transmission port, reject or perform enabling processing by using the corresponding port
C. When there is a port number but the port number is different from the port number of the transmission port, reject
D. When there is a Port selection by eUICC flag, neglect this and perform enabling processing by using the corresponding transmission port
3. When a dedicated ISD-R port is selected:
A. When there is a port number, perform processing by using the corresponding port
B. When there is no port number, reject or perform enabling processing by using an available port and respond to the terminal with the port number used for the enabling
C. When there is a Port selection by eUICC flag, perform enabling processing by using an available port and respond to the terminal with the port number used for the enabling The corresponding eUICC 6-10 may transmit a request triggering the REFRESH proactive command in the corresponding profile port to the modem through the dedicated or exclusive ISD-R port or transmit the REFRESH proactive command through any port according to the ISD-R access scheme so that the modem may process the REFRESH proactive command as defined in ETSI TS 102.223, delete cached data information according to the profile state change, release the network detach process, and request a reset from the eUICC, so as to restart the application session.

According to the result of processing the corresponding REFRESH command by the modem, the eUICC may complete the enabling process by enabling selected profile 3 or disabling profile 1 (operation 6-75) after receiving a terminal response (in a case where an eUICC profile state change is transmitted) or the RESET (in a case where a UICC reset is processed) (operation 6-70). When the refreshFlag is not set in operation 6-30, the eUICC performs matching by using a port number through selected profile 3 has been transmitted after operation 6-35, and when there has been a profile enabled on the corresponding port (profile 1 in the case described above), the eUICC processes the profile as disabled and perform enabling, or when the enabling is performed through a port that is previously unoccupied, the eUICC performs (operation 6-85) enabling corresponding profile 3 only (operation 6-75). The eUICC 6-10 may respond to the LPA 6-05 with a result of performing the corresponding process (operation 6-90). The corresponding responding message may include port number(s) requiring a port reset. In addition, even though the corresponding port number(s) are not received, it may be also possible for the LPA 6-05 to determine a port number requiring a port reset and add the same. The LPA 6-05 transmits, to the modem 6-15, the message including the port number(s) received from the eUICC or added through the determination by the LPA and requests a command corresponding to the REFRESH command defined in ETSI TS 102.223, such as cached value deletion according to the profile state change, the modem performs UICC enabling procedure including TERMINAL PROFILE process defined in ETSI TS 102 221 clause 14.5.1 (operation 6-95). The modem 6-15 may perform, in a baseband connected to the port, a network attach process by using information of the profile newly connected to the port (operation 6-100).

Although not illustrated in detail, once information on the port used for mapping between the ISD-R and the profile is received from the LPA or the enabling processing is performed, the ISD-R may update metadata of the corresponding profile and provide the same when the LPA requests information from the ISD-R for local profile management or the LPA requests information from the SM-DP+ for remote profile management. In addition, a profile policy rule (PPR) indicating whether a profile can be used in the MEP environment is additionally indicated in the profile metadata, so that when the profile is installed or enabled, the ISD-R of the eUICC may provide the corresponding information to the LPA as predetermined information indicating whether the profile can be executed independently or together with other profiles, and the user or the SM-DP+ server may utilize the corresponding information.

Figure 7:
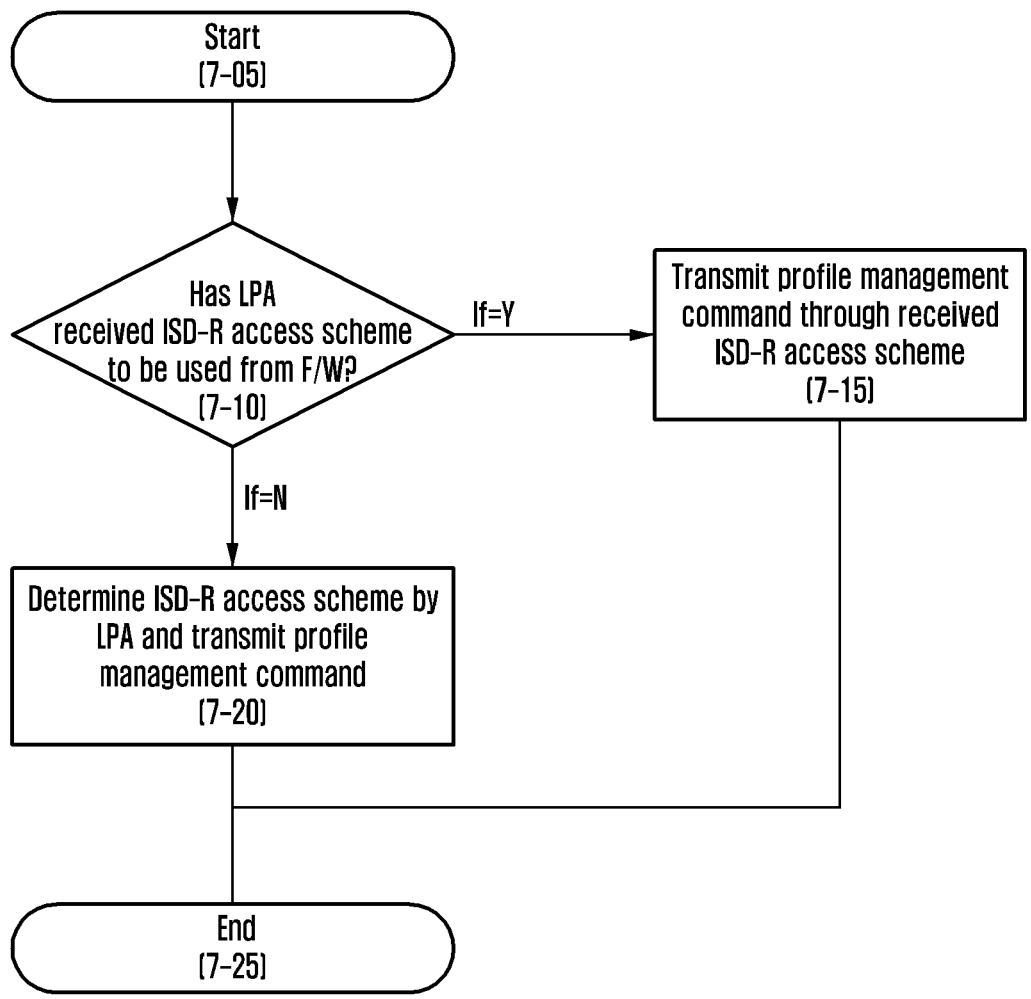
FIG. 7 illustrates an example of the sequence indicating a procedure of ISD-R access scheme determination by an LPA according to various embodiments of the disclosure.

FIG. 7 illustrates an example of the sequence indicating a procedure of ISD-R access scheme determination by an LPA according to various embodiments of the disclosure.

The LPA is assumed to correspond to a v3 MEP-supported LPA and operate in an MEP mode (operation 7-05). As described above, through the terminal-card initialization process, the terminal may acquire an ISD-R access scheme of an eUICC to determine an ISD-R access scheme to be used, or may determine the ISD-R access scheme through a process of mutual negotiation with the eUICC. In addition, a port selection scheme may be additionally determined. The modem having received the corresponding scheme may transfer the corresponding information to a terminal framework, and the terminal framework may broadcast the corresponding information and inform the LPA of the same, or may respond with the corresponding information when a request for the corresponding information is made from the LPA through a framework API. When the LPA receives the ISD-R selection scheme to be used by the LPA while acquiring the LPA configuration, from the terminal framework (operation 7-10), that is, the LPA may transmit a profile management command through the corresponding received ISD-R access scheme, that is, through one of schemes of dedicated, exclusive, and any ports (operation 7-15). When the LPA has received the ISD-R access scheme to be used, from the terminal framework, or has failed to receive the scheme even after requesting the same, the LPA may identify whether there is a scheme pre-configured for the LPA as the ISD-R access scheme, from the LPA configuration or the terminal memory. When there is an identified scheme, the LPA may determine the corresponding pre-configured scheme as the ISD-R access scheme and transmit the profile management command (operation 7-20). When the corresponding pre-configured ISD-R access scheme is determined, a local profile management message is transmitted by always including a port number, or a case in which the port number is always excluded may be possible. This case will be described later in FIGS. 9A to 9E in detail. In addition to the ISD-R access scheme, a preconfigured port selection scheme is determined, the local profile management message is transmitted by always including a port number, or a case in which the port number is always excluded may be possible.

Figure 8:
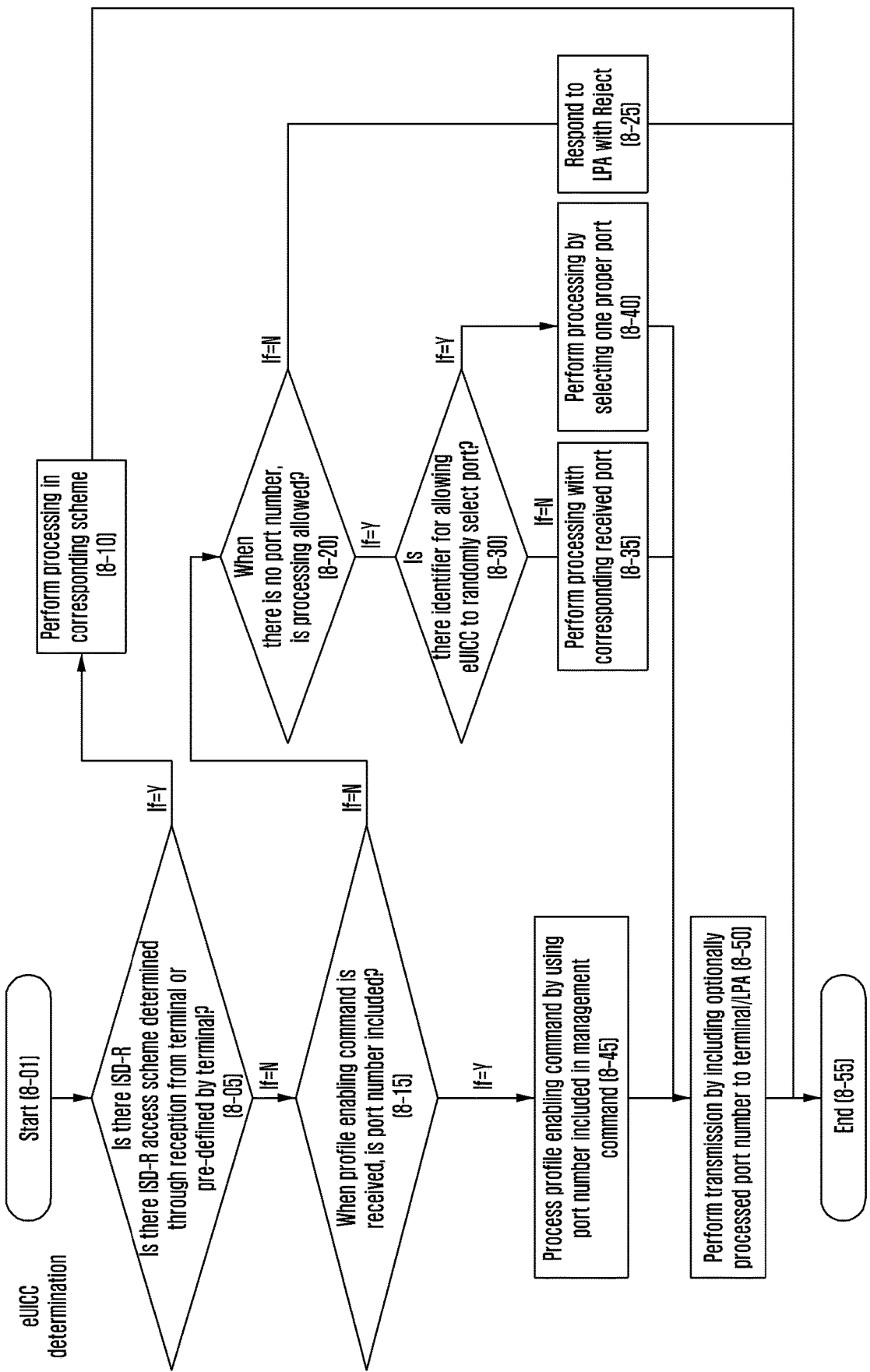
FIG. 8 illustrates an example of the sequence indicating a procedure of determining and processing, by an eUICC, a profile management message received from an LPA, based on an ISD-R access scheme, according to various embodiments of the disclosure.

FIG. 8 illustrates an example of the sequence indicating a procedure of determining and processing, by an eUICC, a profile management message received from an LPA, based on an ISD-R access scheme, according to various embodiments of the disclosure.

The eUICC is assumed to correspond to a v3 MEP-supported eUICC and the eUICC is determined to operate in an MEP mode (operation 8-01). The eUICC may acquire a terminal ISD-R access scheme from the terminal through the terminal-card initialization process to determine an ISD-R access scheme to be used, or may determine an ISD-R access scheme through a negotiation process with the eUICC and store the same as a configuration in the memory in the eUICC or the ISD-R. Alternatively, pre-configuring the ISD-R access scheme pre-negotiated among the terminal, the manufacturer, and the SIM vendor is also possible in the memory of the eUICC or the ISD-R. In addition to the ISD-R access scheme, information on a port selection scheme may also be acquired and configured in the same manner. Through the determination, when the eUICC has an ISD-R access scheme determined by the terminal 8-05, the eUICC may process an access message received in the ISD-R, based on the corresponding configured access scheme (operation 8-10). This may be one of methods in FIGS. 9A, 9D, and 9E, and a detailed description will be made in FIGS. 9 to 9E and a description in FIG. 8 will be omitted.

As a result of the determination above (operation 8-05), the ISD-R selection scheme is not pre-negotiated (no negotiation or no predefined mode) and there is no ISD-R scheme determined through reception from the terminal, the eUICC should configure the ISD-R access scheme so that any ISD-R access scheme selected by the LPA can be accepted. In this case, the eUICC may determine whether a profile enabling management command (ES10c.EnableProfile) includes a port number (operation 8-15), and when there is no port number received, whether the eUICC is configured is identified so that the processing is allowed (operation 8-20). The configuration which does not allow the processing may include, for example, a case where as a port selection scheme, an LPA selection scheme is applied. If the processing is not allowed, the eUICC should respond to the LPA with Reject with respect to the corresponding message processing (operation 8-25). If the configuration is made so that the processing is allowed, the eUICC may additionally determine whether an identifier allowing the eUICC to randomly select a port, for example, a Port Selection by eUICC flag, is included in the ES10c.EnableProfile. Alternatively, there may be a specific port number for corresponding indication, for example, a number such as port number −1, rather than a separate identifier. Alternatively, there may be a case where as a port selection scheme, the eUICC selection scheme is applied. When there is the corresponding identifier, the eUICC may select one proper port to process enabling through the corresponding port (operation 8-40). When the ES10c.EnableProfile does not include an indicator for random port selection of the corresponding eUICC, the enabling processing may be performed through a port through which the corresponding profile enabling request message is received (operation 8-35). When the port number is determined to be included in the profile enabling command and received (operation 8-15) and the port number is included in the management command and received, the profile enabling may be processed through the port number included in the corresponding profile enabling command (operation 8-45). When the profile enabling is processed through operation 8-45, operation 8-35, or operation 8-40, when the eUICC responds to the LPA with the corresponding processing result, the eUICC may include the port number in the result and transmit the same to the LPA or to the modem through the LPA (operation 8-50).

FIGS. 9A to 9E illustrate examples of results obtained by combining a profile transmission port and a profile enabling command message (ES10c.EnableProfile( )) and determining a processing method, based on the ISD-R access scheme by the eUICC, proposed in FIG. 8.

As described above, the eUICC may process a profile enabling command according to one of the followings, based on the ISD-R access scheme.

When the eUICC is unaware of the ISD-R scheme supported by the terminal:

1. When configuration is made so that an enabling message optionally includes a port number (Case 1 in FIG. 9A, 9-10), perform processing according to below as indicated in 9-15
   A. When there is a port number, perform enabling processing by using the port number regardless of a transmission port
   B. When there is no port number, perform enabling processing by using the transmitted port number
   C. When there is no port number and there is an indicator for eUICC port selection, such as a Port Selection by eUICC flag, the eUICC performs enabling processing by using one available port and responds to the terminal with the port number
   D. When there is no Port Selection by eUICC flag but there is a request for a random port configuration such as port number −1, perform enabling processing by using an available port and respond to the terminal with the port number (perform processing in the same manner as a case where there is a Port Selection by eUICC flag)
2. When configuration is made so that an enabling message always includes a port number (Case 2 in FIG. 9B, 9-20), perform processing according to below as indicated in 9-25
A. When there is port number, perform enabling processing by using the port number regardless of a transmission port
B. When there is no port number, perform enabling processing as reject
C. In an exceptional case, when there is no port number but there is a Port Selection by eUICC flag, the eUICC performs enabling processing by using one port by the eUICC itself and responds to the terminal with the port number. When there is no Port Selection by eUICC flag and there is a request for random port configuration such as port number −1, the eUICC performs enabling processing by using an available port and responds to the terminal with the port number (performs processing in the same manner as a case where there is a Port Selection by eUICC flag).
When there is a mutually supported scheme and there is an ISD-R scheme pre-configured or configured through the terminal-card initialization:
3. When an exclusive ISD-R port is selected (Case 3 in FIG. 9C, 9-30), perform processing according to below as indicated in 9-35
A. As indicated in the drawing, when a profile enabling command is received by using a port (Port #1) other than an exclusive port, reject the processing. However, when the eUICC allows the port, in an exceptional case, processing the profile enabling command may be possible without performing the processing as reject
B. When there is a port number, perform processing
C. When there is no port number
i. When there is a Port selection by eUICC flag, perform enabling processing by using an available port and respond to the terminal with the port number used for the enabling. When there is no Port Selection by eUICC flag but there is a request for a random port configuration such as port number −1, perform enabling processing by using the available port remaining after excluding Port #0 and respond to the terminal with the port number (recognize as if there is a Port Selection by eUICC flag)
ii. When there is no Port selection by eUICC flag, reject or recognize that the absence of the port number indicates the existence of the Port Selection by eUICC flag according to the configuration to perform enabling by using an available port remaining after excluding Port #0 and respond to the terminal with the port number used for the enabling
4. When any port is selected (Case 4 in FIG. 9D, 9-40), perform processing according to below as indicated in 9-45
A. When there is no port number, perform enabling processing by using the corresponding transmission port
B. When there is a port number and the port number is identical to a port of the transmission port, reject or perform enabling processing by using the corresponding port
C. When there is a port number but the port number is different from the port number of the transmission port, reject D. When there is a Port selection by eUICC, neglect this and perform enabling processing by using the corresponding transmission port
5. When a dedicated ISD-R port is selected (Case 5 in FIG. 9E, 9-50), perform processing according to below as indicated in 9-55
A. As indicated in the drawing, when a profile enabling command is received through a port (Port #1) other than a dedicated port, processing should be performed as reject in general, but when the eUICC allows this, the profile enabling command may be processed without performing the processing as reject
B. When there is a port number, perform enabling processing by using the corresponding port
C. When there is no port number, reject or recognize that the absence of the port number indicates the existence of the Port Selection by eUICC flag according to the configuration to perform enabling by using an available port and respond to the terminal with the port number used for the enabling
D. When there is a Port selection by eUICC flag, perform enabling processing by using an available port and respond to the terminal with the port number used for the enabling. When there is no Port Selection by eUICC flag but there is a request for a random port configuration such as port number −1, perform enabling processing by using the available port and respond to the terminal with the port number (recognize as if there is a Port Selection by eUICC flag).

Figure 10:
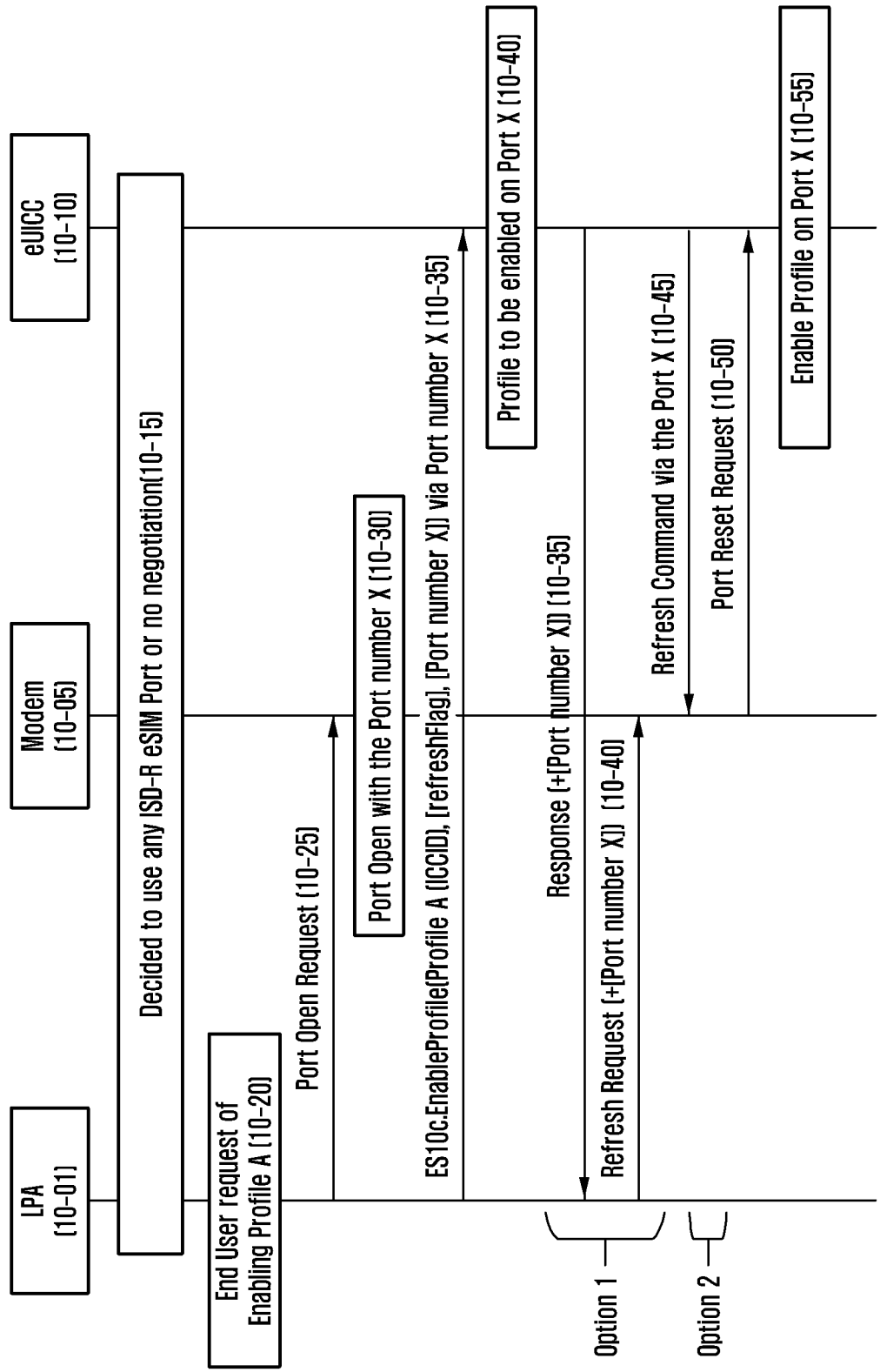
FIG. 10 schematically illustrates a processing method according to an ISD-R access scheme when transmission is performed without a port number according to an embodiment of the disclosure.

FIG. 10 schematically illustrates a processing method according to an ISD-R access scheme when transmission is performed without a port number according to an embodiment of the disclosure.

When an LPA 10-01, a modem 10-05, and an eUICC 10-10 operate in an MEP mode, an access scheme may be determined as any ISD-R eSIM port, through the terminal-card initialization process or pre-configuration, or the eUICC may be unaware of the ISD-R access scheme determined by the terminal due to the absence of the corresponding process (operation 10-15).

In this case, when a user requests enabling of profile A through a user UI of an LPA (operation 10-20), the LPA may request to the modem to generate a port to be used for enabling of the corresponding profile, through an app such as a separately implemented SIM manager or a SIM manager integrated with the LPA, or by the LPA itself (operation 10-25). When the any port scheme is used and the profile is to be enabled, the eSIM port to be enabled may be assumed to be already open. In this case, the modem 10-05 having received the corresponding command may select a specific port number, specify the corresponding port number to open the port, and inform the LPA that the corresponding port is ready. The corresponding port may be already generated and exist in the terminal-card initialization process, and in this case, the LPA 10-01 may also acquire and use information on one of the corresponding generated ports. That is, operation 10-25 and operation 10-30 may be already processed in operation 10-15. The LPA may then transmit ES10c.EnableProfile( ) 10-35 for profile enabling to the eUICC through the corresponding Port X (operation 10-35). As described above, in the any port scheme, a profile enabling message may be transmitted through the corresponding eSIM port to be enabled, without a port number. The eUICC 10-10 having received the corresponding message may perform a process for processing enabling of the profile, that is, profile A, as described in FIG. 6 above, so as to mark state information of the profile with Profile to be enabled on Port X in the memory of the ISD-R or metadata of the profile (operation 10-40). After changing the state, the eUICC 10-10 may respond to the LPA by including a port number with the enabled profile as optional (operation 10-35), so that the LPA requests, from the modem, processing of a modem configuration change according to the profile state change (operation 10-40). Alternatively, a REFRESH proactive command according to the profile state change may be transmitted through a response APDU that is transmitted from the eUICC 10-10 to the modem 10-05 as a response value for the APDU command sent by the modem (operation 10-45), and thus, modem configuration change processing according to the profile state change may be requested. The modem 10-05 having received the corresponding request may perform an operation such as deleting cached information according to the corresponding profile state change, and may newly request a reset of the corresponding port from the eUICC 10-10 (operation 10-50). When the eUICC 10-10 having received the corresponding request performs the reset of the port, the eUICC 10-10 may enable profile A, which has been marked with Profile to be enabled on Port X (operation 10-40), on Port X to complete the reset process for the port. Once the reset is performed and the ATR is received, the modem may perform network connection (network attach) process by utilizing information on the profile enabled on the corresponding port, in a baseband connected to the corresponding port.

Figure 11:
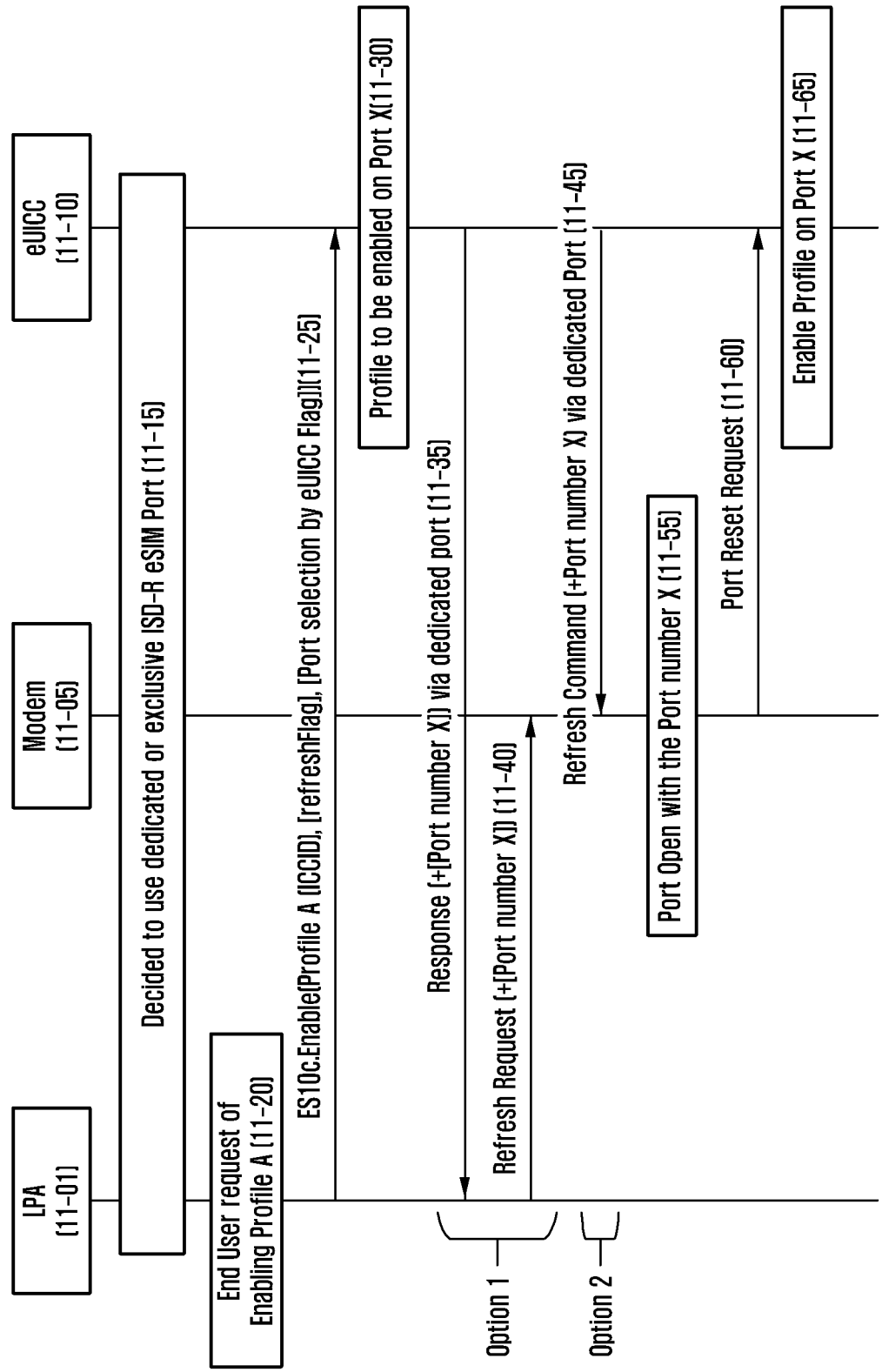
FIG. 11 schematically illustrates a processing method according to an ISD-R access scheme when transmission is performed without a port number according to another embodiment of the disclosure.

FIG. 11 schematically illustrates a processing method according to an ISD-R access scheme when transmission is performed without a port number according to another embodiment of the disclosure.

When an LPA 11-01, a modem 11-05, and an eUICC 11-10 operate in an MEP mode, a dedicated or exclusive ISD-R port access scheme may be determined through the terminal-card initialization process or pre-configuration (operation 11-15).

In this case, when a user requests enabling of profile A through a user UI of the LPA (operation 11-20), the LPA may then transmit ES10c.EnableProfile( ) 11-25 for profile enabling to the eUICC through a port designated to be used as a dedicated or exclusive port (operation 11-35). When ES10c.EnableProfile( ) is transmitted through the dedicated or exclusive ISD-R port, one of messages below may be transmitted without a port number to be enabled.
1. Transmission by including a number, for example −1, which is designated through a separate indicator indicating that a port number selected by the eUICC is to be designated as a port number, or
2. Transmission by not including a separate indicator indicating that there is no port number and a port number selected by the eUICC is to be designated, or
3. Transmission by including a separate indicator indicating that there is no port number and port number selected by the eUICC is to be designated (e.g., Profile selection by eUICC Flag)

The eUICC 11-10 having received the corresponding message may perform a process for processing enabling of the profile, that is, profile A, as described in FIG. 6 above. When the port number is included as described above (operation 11-25), the port is generated and the port number is allocated by the modem, as described in FIG. 10 above, but the modem as shown in FIG. 11 may be in a state in which a port is not opened in three cases above where transmission is performed without a port number. In the case of "2. transmission by not including a separate indicator indicating that there is no port number and a port number selected by the eUICC is to be designated" above, a selection port scheme may be configured as an eUICC selection port scheme for the eUICC, as described in FIG. 4 above.

The eUICC having received the corresponding message may specify one port number to be used for profile enabling and mark state information of the profile with Profile to be enabled on Port X in the memory of the ISD-R or metadata of the profile (operation 11-40). The eUICC 11-10 may then respond to the LPA by mandatorily including the port number with the enabled profile (operation 11-35), so that the LPA requests, from the modem, processing of a modem configuration change according to the profile state change (operation 11-40). Alternatively, a designated port number is included while a REFRESH proactive command according to the profile state change may be transmitted through a response APDU that is transmitted from the eUICC 11-10 to the modem 11-05 as a response value for the APDU command sent by the modem (operation 11-45), and thus, modem configuration change processing according to the profile state change may be requested. The modem 11-05 having received the corresponding request may perform an operation such as deleting cache information according to the corresponding profile state change, if necessary, and when the corresponding port is not opened, the modem may selectively open the corresponding port, map the number with the received port number X (operation 11-55) and then request a reset of the corresponding port from the eUICC (operation 11-60). It may be possible for the modem to open the port and allocate the number at a specific point before processing of the port in operation 11-25. When the eUICC 11-10 having received the corresponding request performs the reset of the port, the eUICC 11-10 may enable profile A, which has been marked with Profile to be enabled on Port X (operation 11-40), on Port X to complete the reset process for the port (operation 11-65). Once the reset is performed and the ATR is received, the modem may perform network connection (network attach) process by utilizing information on the profile enabled on the corresponding port, in a baseband connected to the corresponding port.

In order for the eUICC to select a random port, the eUICC may designate a predetermined port by referring to PPR information on the port and enabled profiles, such as whether there is an empty port having no enabled profile, among eSIM ports opened by the terminal, a port having no enabled PPR1, a port having a lower port number, etc. If the enabling is randomly requested but all ports are currently occupied by the profiles and there is no port available, the eUICC 11-10 may respond to the LPA with an error message indicating that there is no port available for enabling.

Figure 12:
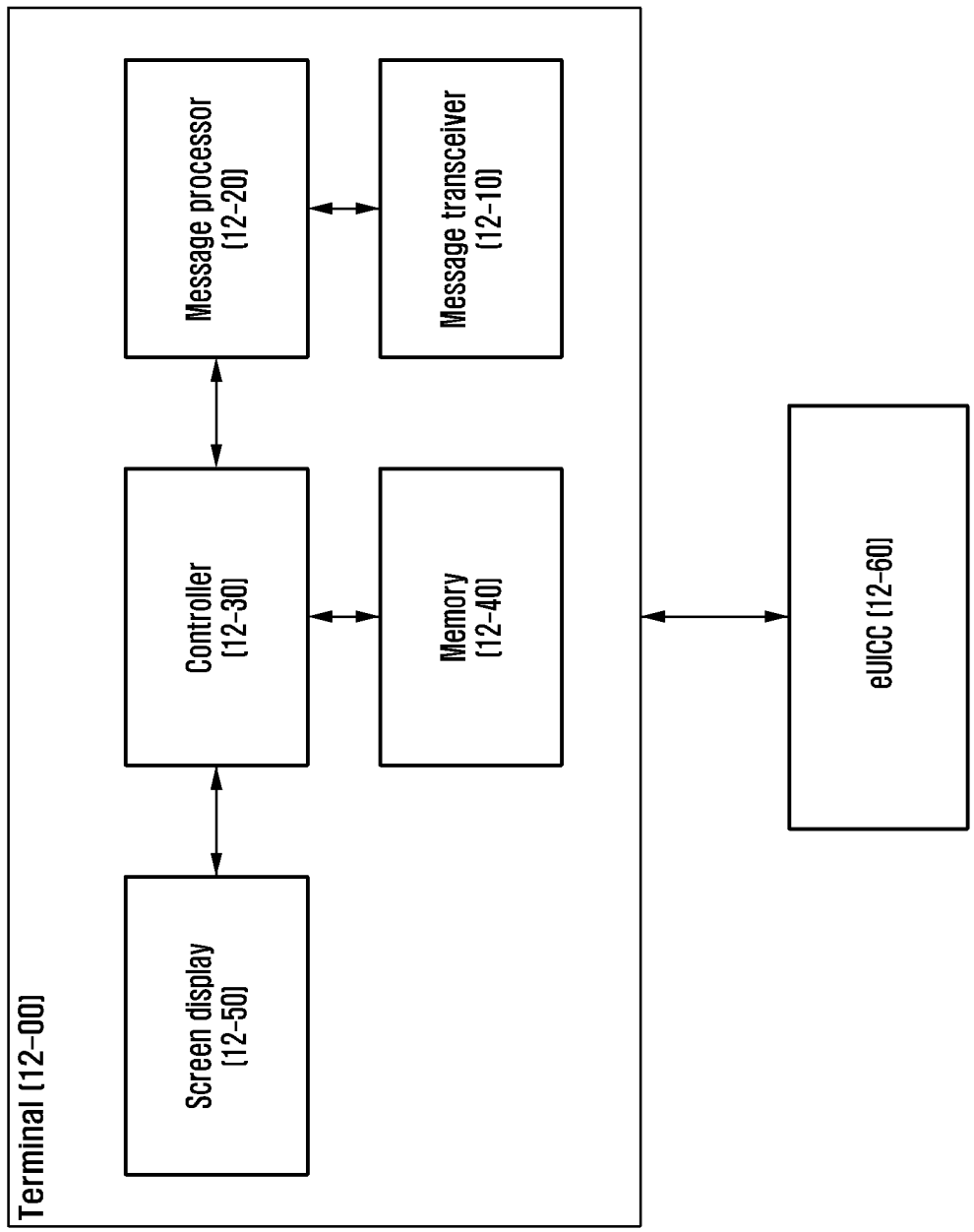
FIG. 12 schematically illustrates an internal structure of a terminal in a wireless communication system according to an embodiment of the disclosure.

FIG. 12 schematically illustrates an internal structure of a terminal in a wireless communication system according to an embodiment of the disclosure.

Referring to FIG. 12, a terminal 12-00 may include a transceiver 12-10, a message processor 12-20, a controller 12-30, a memory 12-40, and a screen display 12-50. However, elements of the terminal 12-00 are not limited to the elements described above. For example, a base station may include more or less elements than the elements described above. In addition, at least one element of the terminal 12-00 may be implemented as a single chip. According to some embodiments, the transceiver 12-10 may perform a function for transmitting or receiving a signal through a radio channel, such as signal-band conversion, amplification, etc. That is, the transceiver 12-10 may include an RF processor for up-converting a baseband signal into an RF band signal to transmit the same through an antenna, and down-converting an RF band signal received through the antenna into a baseband signal, and may further include a transmission filter, a reception filter, an amplifier, a mixer, an oscillator, a digital-to-analog converter (DAC), an analog-to-digital converter (ADC), etc.

In addition, the transceiver 12-10 may receive a signal through a radio channel, output the same to a processor 12-30, and transmit a signal output from the controller 12-30 through a radio channel. The transceiver 12-10 may perform beamforming. For beamforming, the transceiver 12-10 may adjust the phases and magnitudes of signals transmitted and received through multiple antennas or antenna elements. In addition, a baseband processor in the transceiver 12-10 may perform a conversion function between a baseband signal and a bit string according to a physical layer standard of a system. For example, during data transmission, the baseband processor may generate complex symbols by encoding and modulating a transmission bit string. In addition, during data reception, the baseband processor may reconstruct a received bit string by demodulating and decoding the baseband signal provided from the RF processor. For example, according to an orthogonal frequency division multiplexing (OFDM) scheme, during data transmission, the baseband processor may generate complex symbols by encoding and modulating a transmission bit string, map the complex symbols to subcarriers, and then configure OFDM symbols through an inverse fast Fourier transform (IFFT) operation and cyclic prefix (CP) insertion.

In addition, during data reception, the baseband processor may segment the baseband signal provided from the RF processor in units of OFDM symbols, reconstruct signals mapped to the subcarriers through a fast Fourier transform (FFT) operation, and then reconstruct a received bit string through demodulation and decoding.

The transceiver 12-10 may be defined as a transceiver and include a message transceiver. The message processor 12-20 may perform an operation of determining a message of data transmitted or received through the transceiver 12-10. For example, the message processor 12-20 may determine whether the received message is a control message of an RRC layer (including a system information block (SIB)) or a data message of a user. The message processor 12-20 may be included in the controller 12-30.

The controller 12-30 controls overall operations of the terminal 12-00. For example, the controller 12-30 transmits or receives a signal through the message processor 12-20. In addition, the controller 12-30 records and reads data in and from the memory 12-40. There may be at least one controller 12-30. For example, the controller 12-30 may include a communication processor (CP) performing a control for communication and an application processor (AP) controlling a higher layer, such as application programs. According to some embodiments, if there is operator configuration information for a device change, pre-stored in the memory 12-40, the controller 12-30 may request the corresponding information from the memory 12-40 so that the screen display 12-50 can display the same or may process an additional operation by receiving the corresponding information.

The controller 12-30, the message processor 12-20, and the transceiver 12-10 may control the terminal 12-00 to perform access to a selected operator network according to a user or terminal configuration. In addition, according to some embodiments, the controller 12-30 may perform a process of recording data read through the memory 12-40, or matching information collected through the controller 12-30, the message processor 12-20, and the transceiver 12-10 to allow the terminal to infer and process the information which may be referred to for service selection. In some embodiments, the controller 12-30 may determine whether a user's consent to specific information stored in the terminal 12-00 is needed, and display the same on the screen display 12-50.

In addition, the controller 12-30 may control the terminal 12-00 to perform the operation corresponding thereto. According to some embodiments, the controller 12-30 may include an LPA for driving and controlling an eUICC, and an application implemented to be integrated with the LPA. In addition, according to some embodiments, the controller 12-30 may include a terminal framework in which information received in the LPA or the application is interpreted to process a specific command APDU request from a communication processor (CP) or all or some of the requested information is collected from the memory 12-40 to respond to the LPA or the application.

The controller 12-30 may collect predetermined information acquired from the eUICC 12-60 through the terminal 12-00 and the transceiver 12-10 to determine the ISD-R access scheme and the operation in the MEP mode, so as to respond to the eUICC 12-60. The eUICC 12-60 may be controlled by the controller 12-30, and according to the embodiments of the disclosure, the eUICC 12-60 may perform each management command and transfer a proactive command to the modem, etc.

The memory 12-40 stores data such as basic programs, application programs, and configuration information for the operation of the terminal 12-00. In an embodiment, the memory 12-40 may include a storage medium such as ROM, RAM, hard disk, CD-ROM, and DVD, or a combination of storage media, and provide data stored as terminal capability upon the request from the controller 12-30. In addition, the memory 12-40 may be integrally implemented with the controller 12-30 as a system on chip (SoC).

In the embodiments of the disclosure, the eUICC 12-60 may exist outside of the terminal 12-00 as a separate module and may be detachably inserted into the terminal. In addition, the eUICC 12-60 may be configured to include, in the eUICC 12-60, some or all of other elements remaining after excluding the screen display 12-50 from the module of the terminal 12-00. For example, according to an embodiment of the disclosure, the controller of the eUICC 12-60 may process and acquire terminal capability information of the terminal 12-00, received through the message transceiver, through the message processor, and then acquire/combine predetermined information of the ISD-R access scheme and whether the MEP is supported, through the corresponding message information, so as to determine whether the MEP is supported and the ISD-R access scheme in the eUICC 12-60, and accordingly, configure profile enabling authority for each port or authority to allow access to ISD-R application ID (AID) for each port. It should be noted that the terminal 12-00 may include a UICC, an eUICC, an iSSP, and a iUICC, as an embedded hardware security module.

The screen display 12-50 may display information processed by the controller 12-30 or display a proceeding process of an operation performed by the terminal 12-00 through the processing of the controller 12-30, a consent to an event requested to be performed from the user, etc. In some embodiments, stored profile information, profile enabling request input, and an input result may be sent as a response to the user and displayed. In some embodiments, the LPA or the application integrally implemented with the LPA may include the screen display 12-50 and the controller 12-30.

The terminal according to various embodiments disclosed herein may be an electronic device, and the electronic device may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., an electronic device). For example, a processor of the machine (e.g., an electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   transmitting, to an embedded universal integrated circuit card (eUICC) in the terminal, a command for configuring at least one embedded subscriber identity module (eSIM) port, the command including first information, wherein the first information includes at least one multiple enabled profiles (MEP) mode supported by the terminal, wherein the at least one MEP mode is included in MEP modes which are associated with an issuer security domain-root (ISD-R) selection and an eSIM port selection;
   receiving, from the eUICC, a response including at least one of second information and third information as a response to the command, wherein the second information identified based on the first information includes information for an MEP mode jointly supported by the terminal and the eUICC, wherein the third information includes one or more MEP modes supported by the eUICC, wherein the one or more MEP modes are included in the MEP modes; and
   identifying, an MEP mode based on the at least one of the second information and the third information.

2. The method of claim 1,
wherein the MEP modes include a first MEP mode, a second MEP mode, and a third MEP mode.

3. The method of claim 2,
wherein the first MEP mode is associated with the eSIM port being selected by the terminal,
wherein the second MEP mode is associated with the eSIM port being selected by the eUICC, and
wherein the third MEP mode is associated with the ISD-R being selected on any eSIM port.

4. The method of claim 1, further comprising:
switching to a single enabled profile (SEP) mode in case that the second information indicates that there is no jointly supported MEP mode.

5. The method of claim 1, further comprising:
transmitting, to the eUICC, a message based on the identified MEP mode.

6. A method performed by an embedded universal integrated circuit card (eUICC) in a terminal in a wireless communication system, the method comprising:
receiving, from the terminal, a command for configuring at least one embedded subscriber identity module (eSIM) port, the command including first information, wherein the first information includes at least one multiple enabled profiles (MEP) mode supported by the terminal, wherein the at least one MEP mode is included in MEP modes which are associated with an issuer security domain-root (ISD-R) selection and an eSIM port selection;
identifying second information including information for an MEP mode jointly supported by the terminal and the eUICC based on the first information; and
transmitting, to the terminal, a response including at least one of the second information and third information as a response to the command, wherein the third information includes one or more MEP modes supported by the eUICC, wherein the one or more MEP modes are included in the MEP mode,
wherein an MEP mode is identified based on at least one of the second information and the third information.

7. The method of claim 6,
wherein the MEP modes include a first MEP mode, a second MEP mode, and a third MEP mode.

8. The method of claim 7,
wherein the first MEP mode is associated with the eSIM port being selected by the terminal,
wherein the second MEP mode is associated with the eSIM port being selected by the eUICC, and
wherein the third MEP mode is associated with the ISD-R being selected on any eSIM port.

9. The method of claim 6,
wherein the MEP mode is switched to a single enabled profile (SEP) mode in case that the second information indicates that there is no jointly supported MEP mode.

10. The method of claim 6, further comprising:
receiving, from the terminal, a message based on the identified MEP mode.

11. A terminal in a wireless communication system, the terminal comprising:
a transceiver capable of transmitting or receiving at least one signal; and
a controller coupled to the transceiver,
wherein the controller is configured to:
transmit, to an embedded universal integrated circuit card (eUICC) in the terminal, a command for configuring at least one embedded subscriber identity module (eSIM) port, the command including first information, wherein the first information includes at least one multiple enabled profiles (MEP) mode supported by the terminal, wherein the at least one MEP mode is included in MEP modes which are associated with an issuer security domain-root (ISD-R) selection and an eSIM port selection,
receive, from the eUICC, a response including at least one of second information and third information as a response to the command, wherein the second information identified based on the first information includes information for an MEP mode jointly supported by the terminal and the eUICC, wherein the third information includes one or more MEP modes supported by the eUICC, wherein the one or more MEP modes are included in the MEP modes, and
identify, an MEP mode based on the at least one of the second information and the third information.

12. The terminal of claim 11,
wherein the MEP modes include a first MEP mode, a second MEP mode, and a third MEP mode.

13. The terminal of claim 12,
wherein the first MEP mode is associated with the eSIM port being selected by the terminal,
wherein the second MEP mode is associated with the eSIM port being selected by the eUICC, and
wherein the third MEP mode is associated with the ISD-R being selected on any eSIM port.

14. The terminal of claim 11,
wherein the controller is further configured to switch to a single enabled profile (SEP) mode in case that the second information indicates that there is no jointly supported MEP mode.

15. The terminal of claim 11, wherein the controller is further configured to transmit, to the eUICC, a message based on the identified MEP mode.

16. An embedded universal integrated circuit card (eUICC) in a terminal in a wireless communication system, the eUICC comprising:
a transceiver capable of transmitting or receiving at least one signal; and
a controller coupled to the transceiver,
wherein the controller is configured to:
receive, from the terminal, a command for configuring at least one embedded subscriber identity module (eSIM) port, the command including first information, wherein the first information includes at least one multiple enabled profiles (MEP) mode supported by the terminal, wherein the at least one MEP mode is included in MEP modes which are associated with an issuer security domain-root (ISD-R) selection and an eSIM port selection,
identify second information including information for an MEP mode jointly supported by the terminal and the eUICC based on the first information; and
transmit, to the terminal, a response including at least one of the second information and third information as a response to the command, wherein the third information includes one or more MEP modes supported by the eUICC, wherein the one or more MEP modes are included in the MEP modes,
wherein an MEP mode is identified based on at least one of the second information and the third information.

17. The eUICC of claim 16,
wherein the MEP modes include a first MEP mode, a second MEP mode, and a third MEP mode.

18. The eUICC of claim 17,
wherein the first MEP mode is associated with the eSIM port being selected by the terminal,
wherein the second MEP mode is associated with the eSIM port being selected by the eUICC, and
wherein the third MEP mode is associated with the ISD-R being selected on any eSIM port.

19. The eUICC of claim 16,
wherein the MEP mode is switched to a single enabled profile (SEP) mode in case that the second information indicates that there is no jointly supported MEP mode.

20. The eUICC of claim 16, wherein the controller is further configured to receive, from the terminal, a message based on the identified MEP mode.

\* \* \* \* \*